US012791885B2

(12) United States Patent
Lo et al.

(10) Patent No.: US 12,791,885 B2
(45) Date of Patent: Nov. 10, 2026

(54) SEMICONDUCTOR PHOTONICS DEVICE AND METHODS OF FORMATION

(71) Applicant: Taiwan Semiconductor Manufacturing Company, Ltd., Hsinchu (TW)

(72) Inventors: Wen-Shun Lo, Hsinchu County (TW); Ta-Wei Chou, New Taipei City (TW); Chih-Tsung Shih, Hsinchu City (TW); Jing-Hwang Yang, Zhubei City (TW); Chi-Yuan Shih, Hsinchu (TW); YingKit Felix Tsui, Cupertino, CA (US); Shih-Fen Huang, Jhubei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 617 days.

(21) Appl. No.: 18/325,739

(22) Filed: May 30, 2023

(65) Prior Publication Data

US 2024/0402521 A1 Dec. 5, 2024

(51) Int. Cl.
*G02F 1/025* (2006.01)
*G02F 1/21* (2006.01)

(52) U.S. Cl.
CPC .............. *G02F 1/025* (2013.01); *G02F 1/212* (2021.01)

(58) Field of Classification Search
None
See application file for complete search history.

(56) References Cited

U.S. PATENT DOCUMENTS

| | | | | |
|---|---|---|---|---|
| 7,747,122 | B2 | 6/2010 | Shetrit et al. | |
| 2016/0313577 | A1 * | 10/2016 | Sun | G02F 1/025 |
| 2021/0063777 | A1 * | 3/2021 | Cho | G02F 1/025 |
| 2022/0276512 | A1 | 9/2022 | Scofield | |

FOREIGN PATENT DOCUMENTS

| | | | |
|---|---|---|---|
| CN | 102165346 | B | 8/2013 |
| TW | 202125033 | A | 7/2021 |

* cited by examiner

*Primary Examiner* — Chad H Smith
(74) *Attorney, Agent, or Firm* — Harrity & Harrity, LLP

(57) ABSTRACT

An optical modulator structure in a photonic integrated circuit includes an L-shaped P-N junction at an optical mode of the optical modulator structure (e.g., an area of the optical modulator structure in which light is generated). The L-shaped P-N junction provides increased area of overlap of the P-N junction at the optical mode relative to another type of junction, such as a horizontal junction or I-shaped junction. The increased area of overlap may enable the optical modulator structure to achieve a greater modulation efficiency.

20 Claims, 21 Drawing Sheets

SEMICONDUCTOR PHOTONICS DEVICE AND METHODS OF FORMATION

BACKGROUND

A semiconductor device may include a photonic integrated circuit that is configured to use optical signals for high speed and secure data transmission between integrated circuits and/or semiconductor dies of the semiconductor device. Optical signals may enable high performance computing system to continue to rapidly scale in performance to satisfy increasing demands for telecommunications (e.g., 5G, 6G, and beyond), machine learning, artificial intelligence, and/or data center applications, among other examples.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
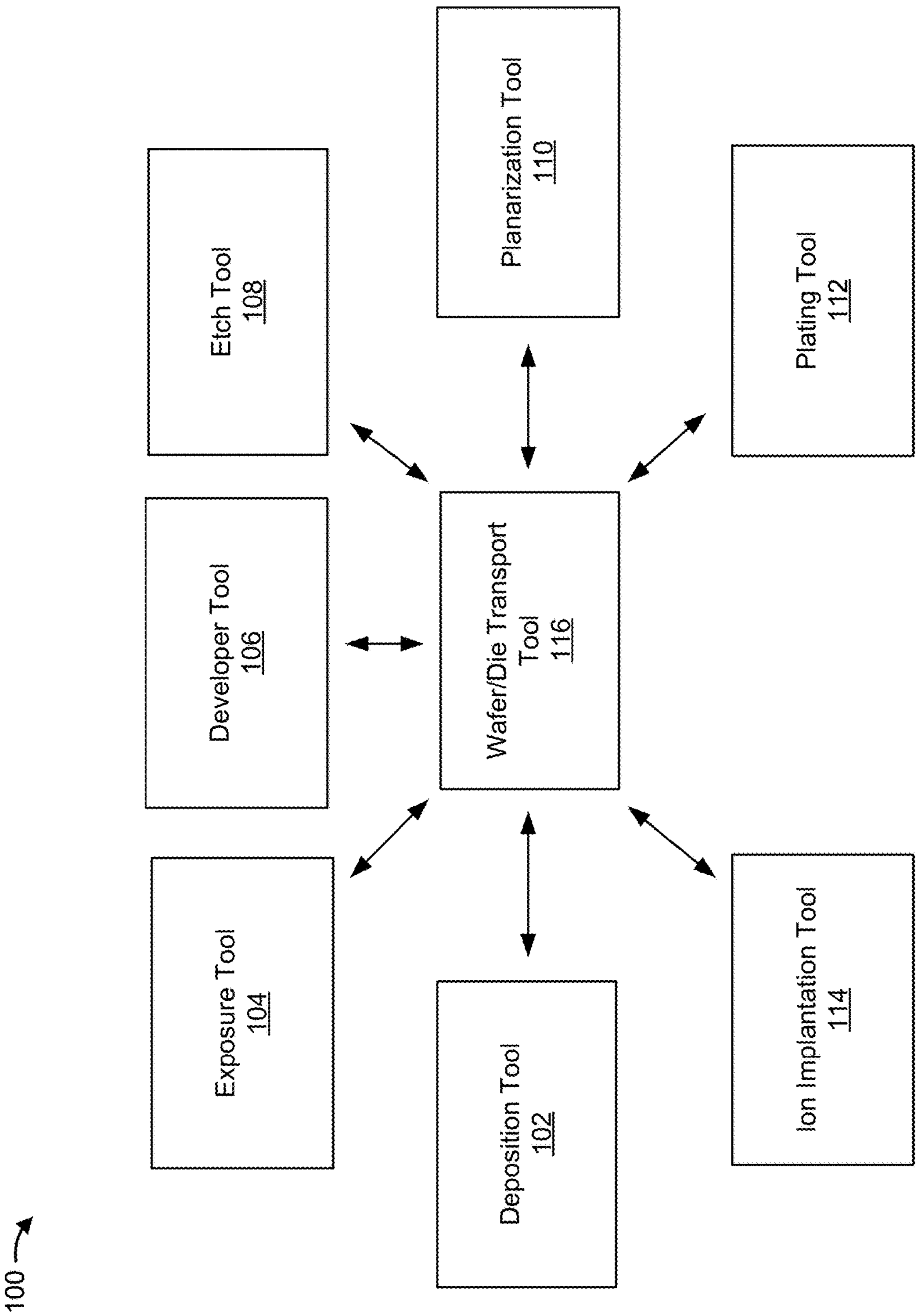
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An optical signal may be transferred through a waveguide structure in a photonic integrated circuit. The waveguide structure enables confinement of the optical signal, which may reduce optical loss and increase propagation efficiency for the optical signal. Data may be encoded into an optical signal by modulating light into optical pulses in an optical modulator structure in the photonic integrated circuit. An optical modulator structure may include a P-N junction that converts an electrical signal into an optical signal with a voltage signal modulation applied into the P-N junction. When a voltage is applied to the P-N junction, the junction depletion width is modified, resulting in changes in concentrations of electrons and holes within waveguide structure. The changes in concentrations of electrons and holes may lead to changes of the effective refractive index of the waveguide structure, which modulates the light intensity within the waveguide structure, thereby enabling the voltage signal to be translated to an optical signal.

Increasing the modulation speed of the photonic integrated circuit may increase bandwidth and/or data transfer rates for the optical signal. In some cases, optical bandwidth and/or electrical bandwidth of the photonic integrated circuit may be increased by reducing electron/hole lifetime in the waveguide structure and/or introducing high doses of impurities into the region optically connecting the waveguide structure and the optical modulator structure.

However, reducing the electron/hole lifetime in the waveguide structure may result in reduced Q-factors for the photonic integrated circuit, which may increase the full-width at half-maximum (FWHM) resonant wavelength line shape for the optical modulator structure. An increased FWHM resonant wavelength line shape for the optical modulator structure may reduce the optical modulation amplitude of the optical modulator structure, which may result in an increase in bit error rate at a receiver that is to receive an optical signal generated by the optical modulator structure.

In some implementations described herein, an optical modulator structure in a photonic integrated circuit includes an L-shaped P-N junction at an optical mode of the optical modulator structure (e.g., an area of the optical modulator structure in which light is generated). The L-shaped P-N junction includes a first portion that includes a first dopant type (e.g., a p-type dopant or an n-type dopant) that overlaps a second portion that includes a second dopant type different from the first dopant type. A first segment of the first portion extends along a side of the second portion. A second segment of the first portion extends along a top of the second portion.

The L-shaped P-N junction provides increased area of overlap of the P-N junction at the optical mode relative to another type of junction, such as a horizontal junction or I-shaped junction. The increased area of overlap may enable the optical modulator structure to achieve a greater modulation efficiency due to variation in charge carrier concentration around the L-shaped P-N junction. The greater modulation efficiency may result in an increased modulation amplitude for the optical modulator structure. This may result in reduced bit error rates at a receiver that is to receive an optical signal generated by the optical modulator structure, particularly in high bandwidth applications such as telecommunications (e.g., 5G, 6G, and beyond), machine learning, artificial intelligence, and/or data center applications, among other examples. The L-shaped P-N junction may be formed using complementary metal oxide semiconductor (CMOS) manufacturing techniques, which may include the use of self-aligned ion implantation.

FIG. 1 is a diagram of an example environment 100 in which systems and/or methods described herein may be implemented. As shown in FIG. 1, environment 100 may include a plurality of semiconductor processing tools 102-114 and a wafer/die transport tool 116. The plurality of semiconductor processing tools 102-114 may include a deposition tool 102, an exposure tool 104, a developer tool 106, an etch tool 108, a planarization tool 110, a plating tool 112, an ion implantation tool 114, and/or another type of semiconductor processing tool. The tools included in example environment 100 may be included in a semiconductor clean room, a semiconductor foundry, a semiconductor processing facility, and/or manufacturing facility, among other examples.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma enhanced CVD (PECVD) tool, a low pressure CVD (LPCVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or the like. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or the like. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The ion implantation tool 114 is a semiconductor processing tool that is capable of implanting ions into a substrate. The ion implantation tool 114 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The wafer/die transport tool 116 may be included in a cluster tool or another type of tool that includes a plurality of processing chambers, and may be configured to transport substrates and/or semiconductor devices between the plurality of processing chambers, to transport substrates and/or semiconductor devices between a processing chamber and a buffer area, to transport substrates and/or semiconductor devices between a processing chamber and an interface tool such as an equipment front end module (EFEM), and/or to transport substrates and/or semiconductor devices between a processing chamber and a transport carrier (e.g., a front opening unified pod (FOUP)), among other examples. In some implementations, a wafer/die transport tool 116 may be included in a multi-chamber (or cluster) deposition tool 102, which may include a pre-clean processing chamber (e.g., for cleaning or removing oxides, oxidation, and/or other types of contamination or byproducts from a substrate and/or semiconductor device) and a plurality of types of deposition processing chambers (e.g., processing chambers for depositing different types of materials, processing chambers for performing different types of deposition operations).

In some implementations, one or more of the semiconductor processing tools 102-114 and/or the wafer/die transport tool 116 may perform one or more semiconductor processing operations described herein. For example, one or more of the semiconductor processing tools 102-114 and/or the wafer/die transport tool 116 may dope, using a first implantation mask, a first region of a semiconductor structure of an optical modulator structure with a first dopant type; and may dope, using a second implantation mask, a second region of the semiconductor structure of the optical modulator structure with a second dopant type, the second region being adjacent to the first region, a third region of the semiconductor structure of the optical modulator structure with the first dopant type, where the third region being over the second region, the first region, where the second region and the third region correspond to a P-N junction diode of the optical modulator structure, and wherein the first region, the second region, and the third region form an L-shaped interface of the P-N junction diode, among other examples. One or more of the semiconductor processing tools 102-114 and/or the wafer/die transport tool 116 may perform other semiconductor processing operations described herein, such as in connection with FIGS. 4A-4N and/or 7, among other examples.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example environment 100 may perform one or more functions described as being performed by another set of devices of the example environment 100.

Figure 2:
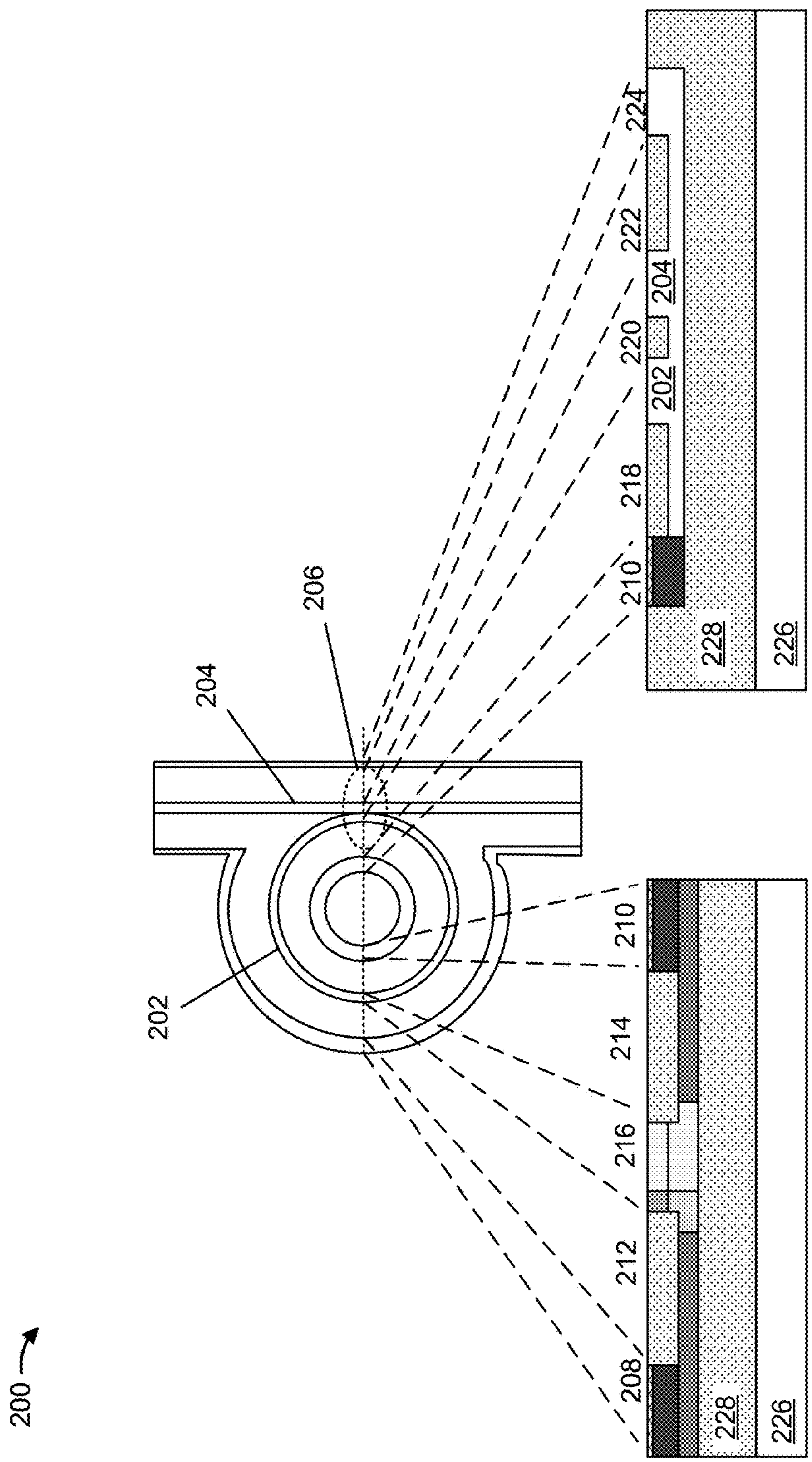
FIG. 2 is a diagram of an example semiconductor device described herein.

FIG. 2 is a diagram of an example semiconductor device 200 described herein. In particular, FIG. 2 illustrates a top-down view of the semiconductor device 200. The semiconductor device 200 may include a semiconductor photonics device and/or another type of semiconductor device that includes one or more photonic integrated circuits.

The semiconductor device 200 may be configured to use optical signals for high speed and secure data transmission between integrated circuits and/or semiconductor dies of the semiconductor device 200. Accordingly, the semiconductor device 200 may include an optical modulator structure 202 and a waveguide structure 204 coupled with the optical modulator structure 202 in a coupling region 206. An optical signal may be transferred through the waveguide structure 204 in the semiconductor device 200. The waveguide structure 204 enables confinement of the optical signal, which may reduce optical loss and increase propagation efficiency for the optical signal. Data may be encoded into an optical signal by modulating light into optical pulses in the optical modulator structure 202. The optical pulses are then transferred to the waveguide structure 204 for propagation to other regions of the semiconductor device 200. The optical modulator structure 202 and the waveguide structure 204 may be adjacent and/or side by side in the semiconductor device 200 to enable coupling of the optical signal from the optical modulator structure 202 to the waveguide structure 204 (and vice-versa for demodulation of an optical signal).

The optical modulator structure 202 may include an approximately circular-shaped structure or an approximately ring-shaped structure, and may be referred to as a micro-ring modulator (MRM). The optical modulator structure 202 may function as a resonance chamber and may modulate an input signal from an optical mode to generate an optical signal (e.g., a modulated light signal). The optical signal may couple to the waveguide structure 204 in the coupling region 206 based on the optical signal satisfying a threshold modulation frequency and/or based on the optical signal satisfying a threshold signal intensity. The waveguide structure 204 may facilitate propagation of the optical signal to another device or area in the semiconductor device 200.

As further shown in FIG. 2, the optical modulator structure 202 may include a plurality of regions. For example, the optical modulator structure 202 may include a contact region 208 and an opposing contact region 210. The contact region 208 may be located at an outer perimeter of the optical modulator structure 202, and the contact region 210 may be located at an inner perimeter of the optical modulator structure 202. The contact region 208 and 210 may be regions of the optical modulator structure 202 that are electrically coupled and/or physically coupled with contacts of the semiconductor device 200.

The optical modulator structure 202 may further include a connection region 212 and a connection region 214. The connection region 212 may be electrically coupled and/or physically coupled with the contact region 208 and with a P-N junction diode 216 of the optical modulator structure 202. The connection region 212 may electrically couple the P-N junction diode 216 with the contact region 208. The connection region 214 may be electrically coupled and/or physically coupled with the contact region 210 and with the P-N junction diode 216 of the optical modulator structure 202. The connection region 214 may electrically couple the P-N junction diode 216 with the contact region 210.

The P-N junction diode 216 is located at an optical mode of the optical modulator structure 202. The P-N junction diode 216 includes a p-type region and an n-type region that are coupled at an interface. As described herein, the interface may be referred to as an L-shaped interface. The interface may be referred to as an L-shaped interface in that the interface includes at least two directional segments. For example, the interface may include an approximately vertical segment in which the p-type region and the n-type region are coupled, and an approximately horizontal segment in which the p-type region and the n-type region are coupled. The connection between the approximately vertical segment and the approximately horizontal segment may be an approximately 90-degree interface or another angle such that the n-type region overlaps (e.g., is on top of) the p-type region (or the p-type region overlaps the n-type region) in the approximately horizontal segment. The L-shaped interface increases the area of overlap between the n-type region and the p-type region (e.g., increases the area of overlap of the P-N junction diode 216 and the optical mode), which may enable the optical modulator structure 202 to achieve a greater modulation efficiency due to variation in charge carrier concentration around the L-shaped interface. The greater modulation efficiency may result in an increased modulation amplitude for the optical modulator structure 202. This may result in reduced bit error rates at a receiver that is to receive an optical signal generated by the optical modulator structure 202.

As further shown in FIG. 2, in the coupling region 206, the optical modulator structure 202 may include the contact region 210, a connection region 218 that couples the contact region 210 with the optical modulator structure 202, a connection region 220 that couples the optical modulator structure 202 with the waveguide structure 204, and a connection region 222 that couples the waveguide structure 204 with an outer region 224.

The semiconductor device 200 may include a substrate 226 and a dielectric region 228 in which the optical modulator structure 202 and the waveguide structure 204 are included. The substrate 226 may be formed of silicon (Si), a material including silicon, a III-V compound semiconductor material such as gallium arsenide (GaAs), and/or another type of semiconductor material. The dielectric region 228 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The waveguide structure 204 may include an undoped semiconductor structure (e.g., an undoped silicon structure) in the dielectric region 228. The optical modulator structure 202 may include one or more doped semiconductor regions, such as one or more p-type regions (e.g., semiconductor regions, such as silicon regions, that include one or more p-type dopants) and one or more n-type regions (e.g., semiconductor regions, such as silicon regions, that include one or more n-type dopants), in the dielectric region.

As indicated above, FIG. 2 is provided as an example. Other examples may differ from what is described with regard to FIG. 2.

Figure 3A:
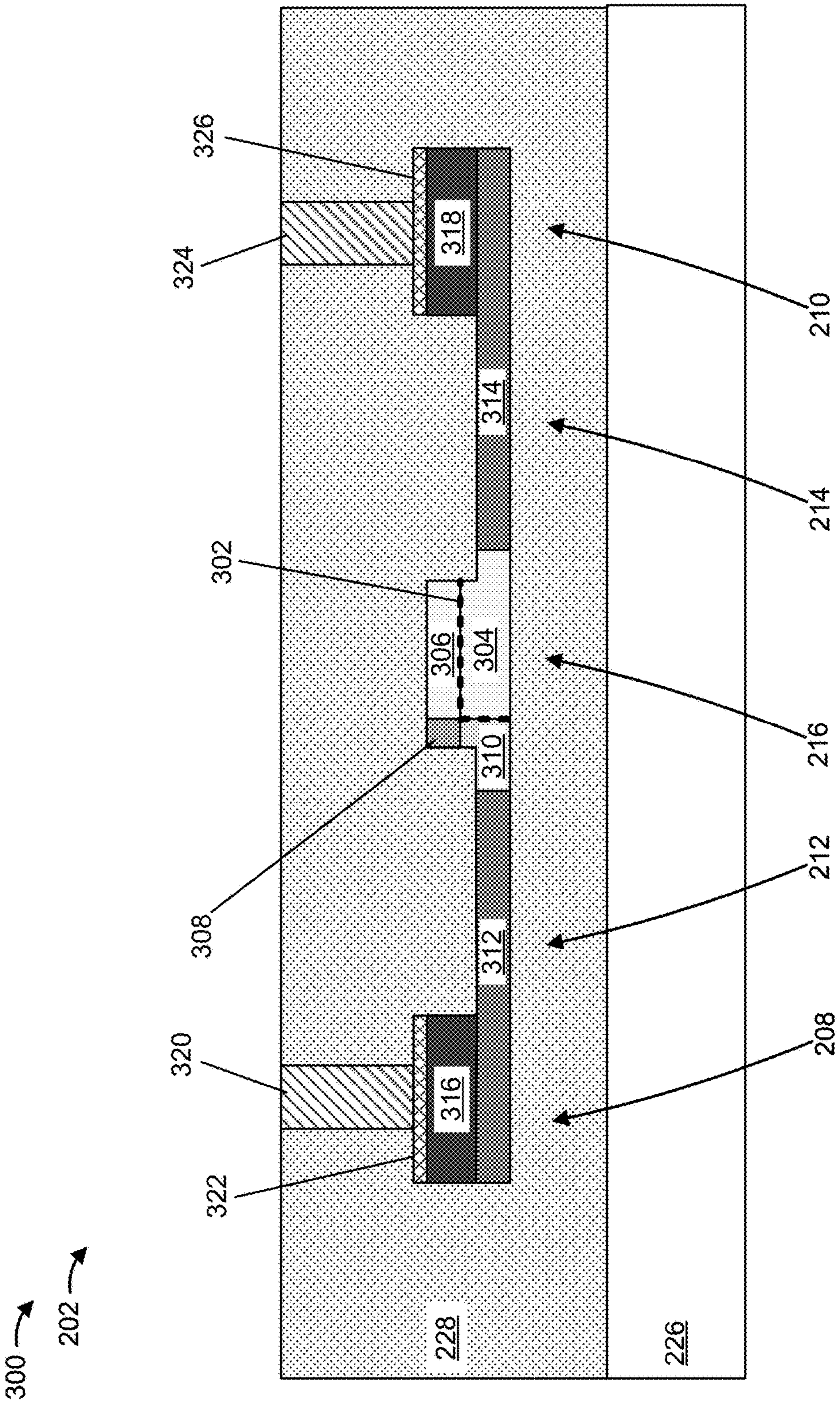
FIGS. 3A and 3B are diagrams of an example implementation of an optical modulator structure described herein.
Figure 3B:
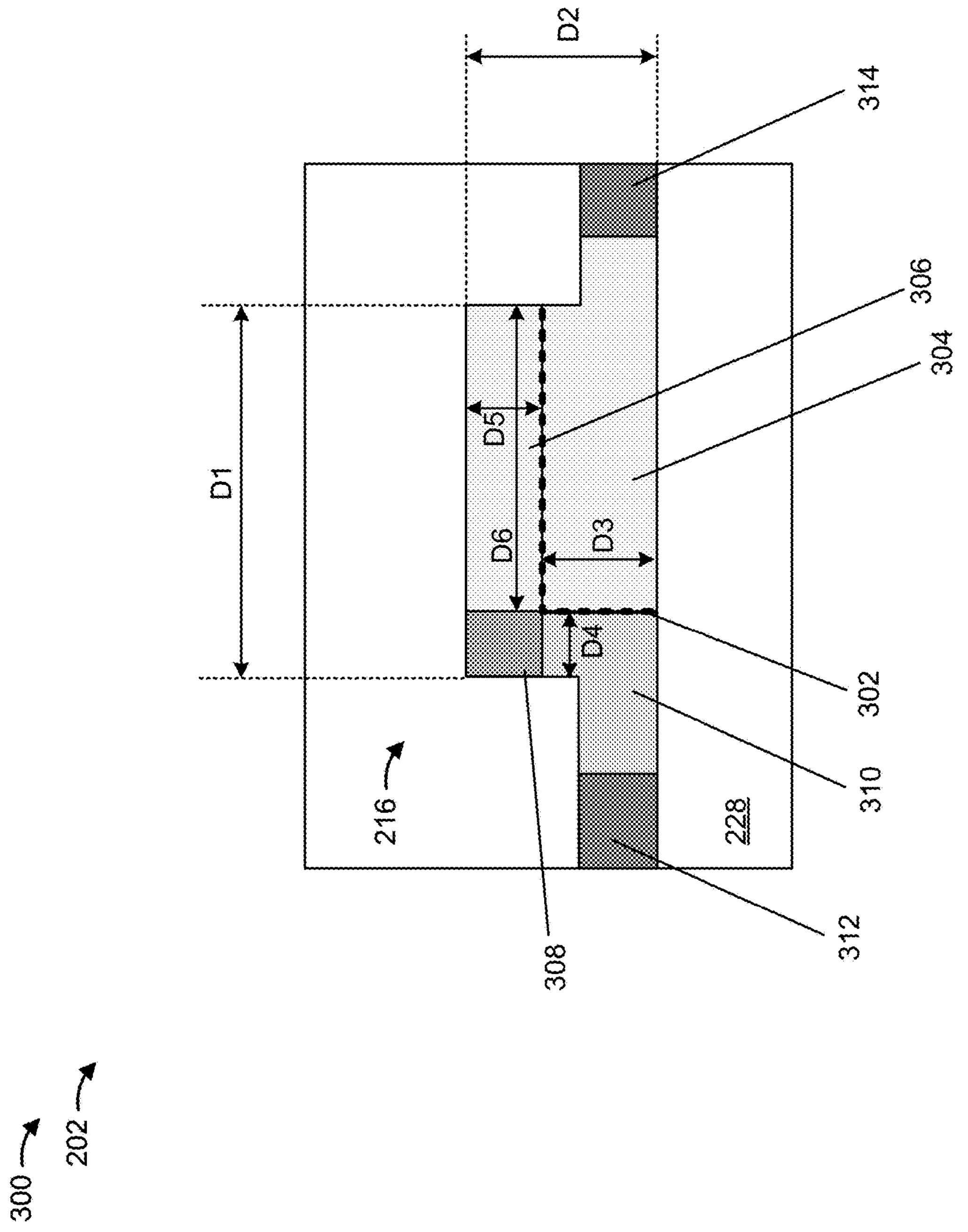

FIGS. 3A and 3B are diagrams of an example implementation of an optical modulator structure 202 described herein. The optical modulator structure 202 may be included in a semiconductor photonics circuit of a semiconductor photonics device, such as the semiconductor device 200 of FIG. 2 or a semiconductor device 500 of FIG. 5, among other examples.

FIG. 3A illustrates a cross-sectional view of the optical modulator structure 202. As shown in FIG. 3A, the optical modulator structure 202 may include the contact regions 208 and 210, the connection regions 212 and 214, and the P-N junction diode 216. The optical modulator structure 202 may be included in the dielectric region 228. The dielectric region 228 may be included over and/or on the substrate 226 and may include one or more dielectric layers, one or more shallow trench isolation (STI) regions, one or more etch stop layers (ESLs), and/or one or more other dielectric structures.

As further shown in FIG. 3A, the optical modulator structure 202 may include a plurality of doped semiconductor regions. The plurality of doped semiconductor regions may facilitate and/or promote the flow of electrons and holes in the optical modulator structure 202 from the contact regions 208 and 210 toward the P-N junction diode 216, and/or to facilitate and/or promote formation of an optical signal from an electrical signal in the optical mode that includes an interface 302 of the P-N junction diode 216.

The plurality of doped regions may include silicon (and/or another semiconductor material) that is doped with one or more types of dopants, such as n-type dopants and/or p-type dopants. The optical modulator structure 202 may include a region 304 of the P-N junction diode 216 that includes a first dopant type. The optical modulator structure 202 may include a region 306 of the P-N junction diode 216 that includes a second dopant type (e.g., that is different from the first dopant type). The region 306 may be located over and/or on the region 304, and may be coupled with the region 304 at the interface 302. A top surface of the region 304 and a bottom surface of the region 306 may correspond to a first segment of the interface 302. The first segment of the interface 302 may be referred to as a horizontal segment and may be approximately parallel with a surface of the substrate 226.

The optical modulator structure 202 may include a region 308 of the P-N junction diode 216. The region 308 may be adjacent to the region 306 and may include the second dopant type. The optical modulator structure 202 may include a region 310 of the P-N junction diode 216. The region 310 may include the second dopant type. The region 310 may be located adjacent to the region 304 such that a segment (e.g., a vertical segment) of the interface 302 corresponds to sides of the region 304 and the region 310. The region 308 may be located over and/or on the region 310, and may connect the region 306 and the region 310.

The region 304 may correspond to a first region of the P-N junction diode 216, and the regions 306, 308, and 310 may be segments of a second region of the P-N junction diode 216. For example, the region 304 may include a p-type region (where the first dopant type may be a p-type dopant), and the regions 306, 308, and 310 may include an n-type region (where the second dopant type may be an n-type dopant) such that the n-type region overlaps the p-type region. The p-type dopant may include p-type ions of a p-type material (e.g., boron (B) or germanium (Ge), among other examples). The n-type dopant may include n-type ions of an n-type material (e.g., phosphorous (P) or arsenic (As), among other examples). Alternatively, the region 304 may include an n-type region (where the first dopant type may be a n-type dopant), and the regions 306, 308, and 310 may include an n-type region (where the second dopant type may be a p-type dopant) such that the p-type region overlaps the n-type region. The interface 302 may be an L-shaped interface (or two-dimensional interface) between the first region and the second region of the P-N junction diode 216 that includes a first segment between the regions 304 and 310, and a second segment between the regions 304 and 306.

The optical modulator structure 202 may further include a region 312 that is physically coupled and/or electrically coupled with the region 310. The region 312 may include the second dopant type such that the regions 306, 308, 310, and 312 include the same dopant type (e.g., an n-type dopant or a p-type dopant). The region 312 may be included in the connection region 212 of the optical modulator structure 202. The optical modulator structure 202 may further include a region 314 that is physically coupled and/or electrically coupled with the region 304. The region 314 may include the first dopant type such that the regions 304 and 314 include the same dopant type (e.g., an n-type dopant or a p-type dopant). The region 314 may be included in the connection region 214 of the optical modulator structure 202.

The optical modulator structure 202 may further include a region 316 that is physically coupled and/or electrically coupled with the region 312. The region 316 may include the second dopant type such that the regions 306, 308, 310, 312, and 316 include the same dopant type (e.g., an n-type dopant or a p-type dopant). The region 316 may be included in the contact region 208 of the optical modulator structure 202. The optical modulator structure 202 may further include a region 318 that is physically coupled and/or electrically coupled with the region 314. The region 318 may include the first dopant type such that the regions 304, 314, and 318 include the same dopant type (e.g., an n-type dopant or a p-type dopant). The region 318 may be included in the contact region 210 of the optical modulator structure 202. The dopant concentrations in the regions 306, 308, 210, 312, and 316 may be configured to facilitate and/or promote the flow of charge carriers (e.g., electrons, holes) from the region 316 to the region 306 through the regions 312, 310 and 308. The different dopant concentrations result in a dopant gradient between the contact region 208 of the optical modulator structure 202 the P-N junction diode 216. The dopant concentration in the region 316 may be greater relative to the dopant concentration in the region 312, and the dopant concentration in the region 312 may be greater relative to the dopant concentrations in the regions 310, 308, and 306. For example, the region 312 may include a dopant concentration that is included in a range of approximately $3\times E^{18}$ dopant ions/per cubic centimeter ($cm^3$) to approximately $1\times E^{20}$ dopant ions/$cm^3$, whereas the regions 310 and 306 may include a dopant concentration that is included in a range of approximately $1\times E^{18}$ dopant ions/$cm^3$ to approximately $3\times E^{19}$ dopant ions/$cm^3$. These ranges may enable a relatively low resistance in the optical modulator structure 202 to be achieved, which may reduce the resistance capacitance (RC) time delay of the optical modulator structure 202 and may increase the cutoff frequency for the optical modulator structure 202. If the dopant concentrations are outside of these ranges, the RC time delay may increase, which may lower the cutoff frequency for the optical modulator structure 202 and may result in lower bandwidth for the optical modulator structure 202. However, other values for these ranges are within the scope of the present disclosure.

The dopant concentrations in the regions 304, 314, and 318 may be configured to facilitate and/or promote the flow of charge carriers (e.g., electrons, holes) from the region 318 to the region 304 through the region 314. The different dopant concentrations result in a dopant gradient between the contact region 210 of the optical modulator structure 202 the P-N junction diode 216. The dopant concentration in the region 318 may be greater relative to the dopant concentration in the region 314, and the dopant concentration in the region 314 may be greater relative to the dopant concentration in the region 304. For example, the region 314 may include a dopant concentration that is included in a range of approximately $3\times E^{18}$ dopant ions/$cm^3$ to approximately $1\times E^{20}$ dopant ions/$cm^3$, whereas the region 304 may include a dopant concentration that is included in a range of approximately $1\times E^{18}$ dopant ions/$cm^3$ to approximately $3\times E^{19}$ dopant ions/$cm^3$. These ranges may enable a relatively low resistance in the optical modulator structure 202 to be achieved, which may reduce the RC time delay of the optical modulator structure 202 and may increase the cutoff frequency for the optical modulator structure 202. If the dopant concentrations are outside of these ranges, the RC time delay may increase, which may lower the cutoff frequency for the optical modulator structure 202 and may result in lower bandwidth for the optical modulator structure 202. However, other values for these ranges are within the scope of the present disclosure.

As further shown in FIG. 3A, a contact structure 320 may be included over the region 316 in the dielectric region 228. A silicide layer 322 may be included over and/or on the region 316. A contact structure 324 may be included over the region 318 in the dielectric region 228. A silicide layer 326 may be included over and/or on the region 318. The contact structure 320 and the contact structure 324 may each include tungsten (W), cobalt (Co), ruthenium (Ru), titanium (Ti), aluminum (Al), copper (Cu) or gold (Au), among other examples of conductive materials. The contact structure 320 and the contact structure 324 may each include vias, trenches, contact plugs, and/or another type of conductive structures. The silicide layer 322 may include a metal silicide layer such as a titanium silicide and/or another type of metal silicide to provide a relatively low contact resistance between the region 316 and a contact structure 320 that is electrically coupled with the region 316. The silicide layer 326 may include a metal silicide layer such as a titanium silicide and/or another type of metal silicide to provide a relatively low contact resistance between the region 318 and a contact structure 324 that is electrically coupled with the region 318.

In some implementations described herein, a semiconductor device (e.g., the semiconductor device 200, the semiconductor device 500) includes a dielectric layer (e.g., the dielectric region 228) and an optical modulator structure 202 in the dielectric layer, where the optical modulator structure 202 includes a first region (e.g., the region 304) including a first dopant type and a second region (e.g., the region 306), on a top surface of the first region, including a second dopant type, where the first region and the second region correspond to a P-N junction diode 216 of the optical modulator structure 202.

In some implementations described herein, a semiconductor device (e.g., the semiconductor device 200, the semiconductor device 500) includes a dielectric layer (e.g., the dielectric region 228) and an optical modulator structure 202 in the dielectric layer, where the optical modulator structure 202 includes a first portion (e.g., the region 304) of a P-N junction diode 216 of the optical modulator structure 202, where the first portion includes a first dopant type; a second portion (e.g., the regions 306, 308, and 310) of the P-N junction diode 216, where the second portion includes a second dopant type. The second portion includes a first segment (e.g., the region 306) on a top surface of the first portion, a second segment (e.g., the region 310) on a side surface of the first portion, and a third segment (e.g., the region 308) connecting the first segment and the second segment.

FIG. 3B illustrates a plurality of example dimensions of a portion of the optical modulator structure 202. In particular, FIG. 3B illustrates a plurality of example dimensions of the P-N junction diode 216.

As shown in FIG. 3B, the P-N junction diode 216 may include an example dimension D1. The dimension D1 may correspond to a cross-sectional width of the P-N junction diode 216 (e.g., between an outer edge of the region 308 and an outer edge of the region 306. In some implementations, the dimension D1 is included in a range of approximately 300 nanometers to approximately 500 nanometers to enable the P-N junction diode 216 to operate in a range of single mode wavelengths of approximately 1310 nanometers to approximately 1550 nanometers. However, other values for the ranges are within the scope of the present disclosure.

As shown in FIG. 3B, the P-N junction diode 216 may include an example dimension D2. The dimension D2 may correspond to a cross-sectional height of the P-N junction diode 216 (e.g., between a bottom surface of the region 304 and a top surface of the region 306. In some implementations, the dimension D2 is included in a range of approximately 200 nanometers to approximately 300 nanometers to enable the P-N junction diode 216 to operate in a range of single mode wavelengths of approximately 1310 nanometers to approximately 1550 nanometers. However, other values for the ranges are within the scope of the present disclosure.

As further shown in FIG. 3B, the P-N junction diode 216 may include an example dimension D3. The dimension D3 may correspond to a thickness of the region 304 and a length of a vertical segment of the interface 302. In some implementations, the dimension D3 is within a range of +/− approximately 50 nanometers of half of the dimension D2. In other words, the dimension D3 may be equal to:

$$D3 = 0.5 * D2 \pm 50 \text{ nm}$$

If the dimension D3 is outside of this range, the optical modulator structure 202 may experience lower modulation efficiency, since the modulation efficiency of the optical modulator structure 202 is proportional to the overlap of the interface 302 and the optical mode of the P-N junction diode 216. If the dimension D3 is within this range, the optical modulator structure 202 may experience greater modulation efficiency. However, other values for the range are within the scope of the present disclosure.

As further shown in FIG. 3B, the P-N junction diode 216 may include an example dimension D4. The dimension D4 may correspond to a width or thickness of the region 308 and a width or thickness of the region 310. In some implementations, the dimension D4 is included in a range of approximately 50 nanometers to approximately 200 nanometers. If the dimension D4 is outside of this range, the optical modulator structure 202 may experience greater resistance and lower modulation efficiency relative to the dimension D4 being included within this range since the modulation efficiency of the optical modulator structure 202 is proportional to the overlap of the interface 302 and the optical mode of the P-N junction diode 216. However, other values for the range are within the scope of the present disclosure.

As further shown in FIG. 3B, the P-N junction diode 216 may include an example dimension D5. The dimension D5 may correspond to a thickness of the region 306. In some implementations, the dimension D5 is approximately equal to the dimension D4. In some implementations, the dimension D3 is greater relative to the dimension D5. In some implementations, the dimension D5 is approximately equal to:

$$D5 = D2 - D3$$

However, other values for D5 are within the scope of the present disclosure.

As further shown in FIG. 3B, the P-N junction diode 216 may include an example dimension D6. The dimension D6 may correspond to a width of the region 306 and a length of a horizontal segment of the interface 302. In some implementations, the dimension D6 is approximately equal to:

$$D6 = D1 - D4$$

However, other values for D6 are within the scope of the present disclosure.

As indicated above, FIGS. 3A and 3B are provided as an example. Other examples may differ from what is described with regard to FIGS. 3A and 3B.

Figure 4A:
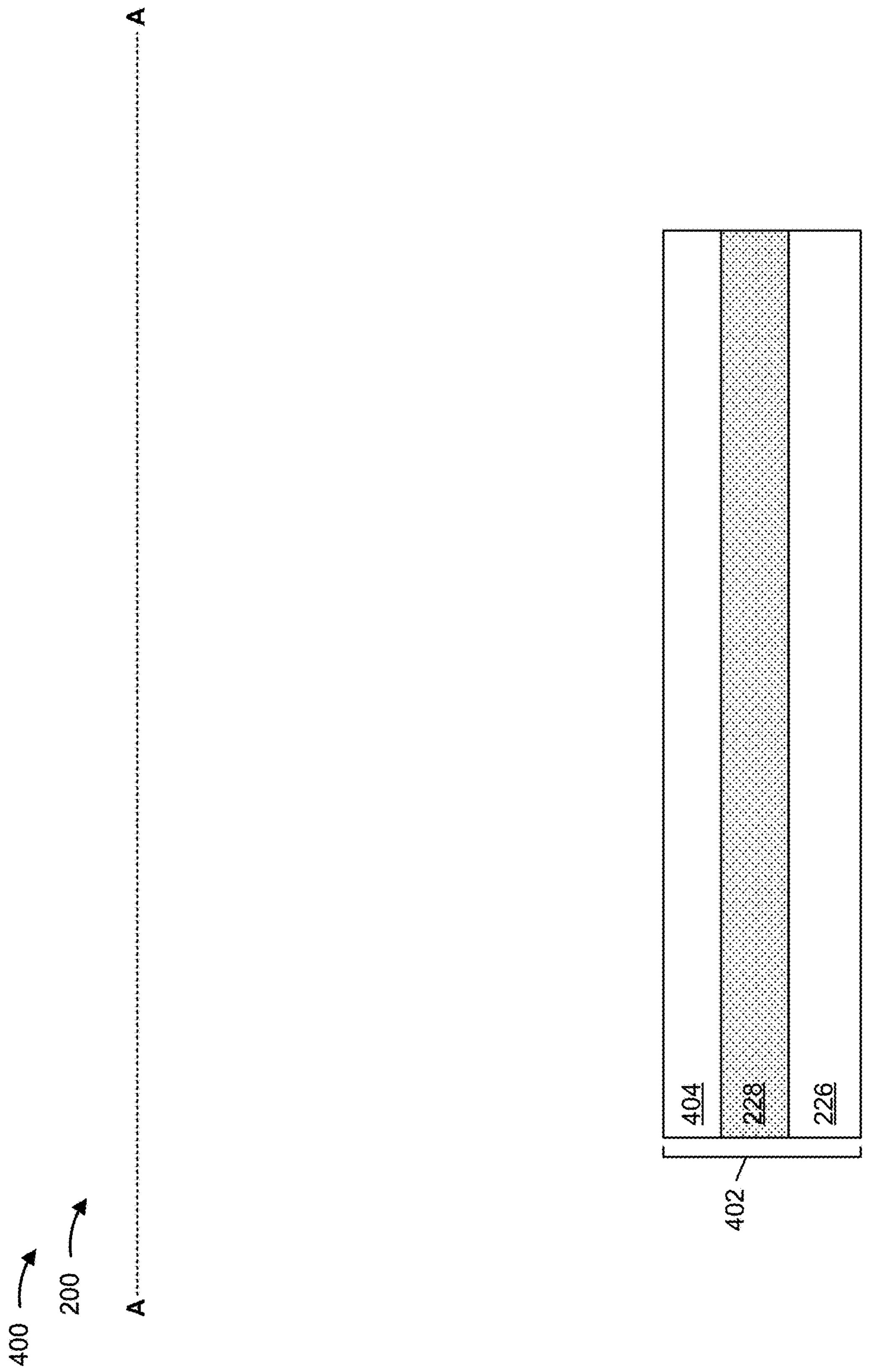
FIGS. 4A-4N are diagrams of an example implementation of forming the semiconductor device (or a portion thereof) described herein.
Figure 4B:
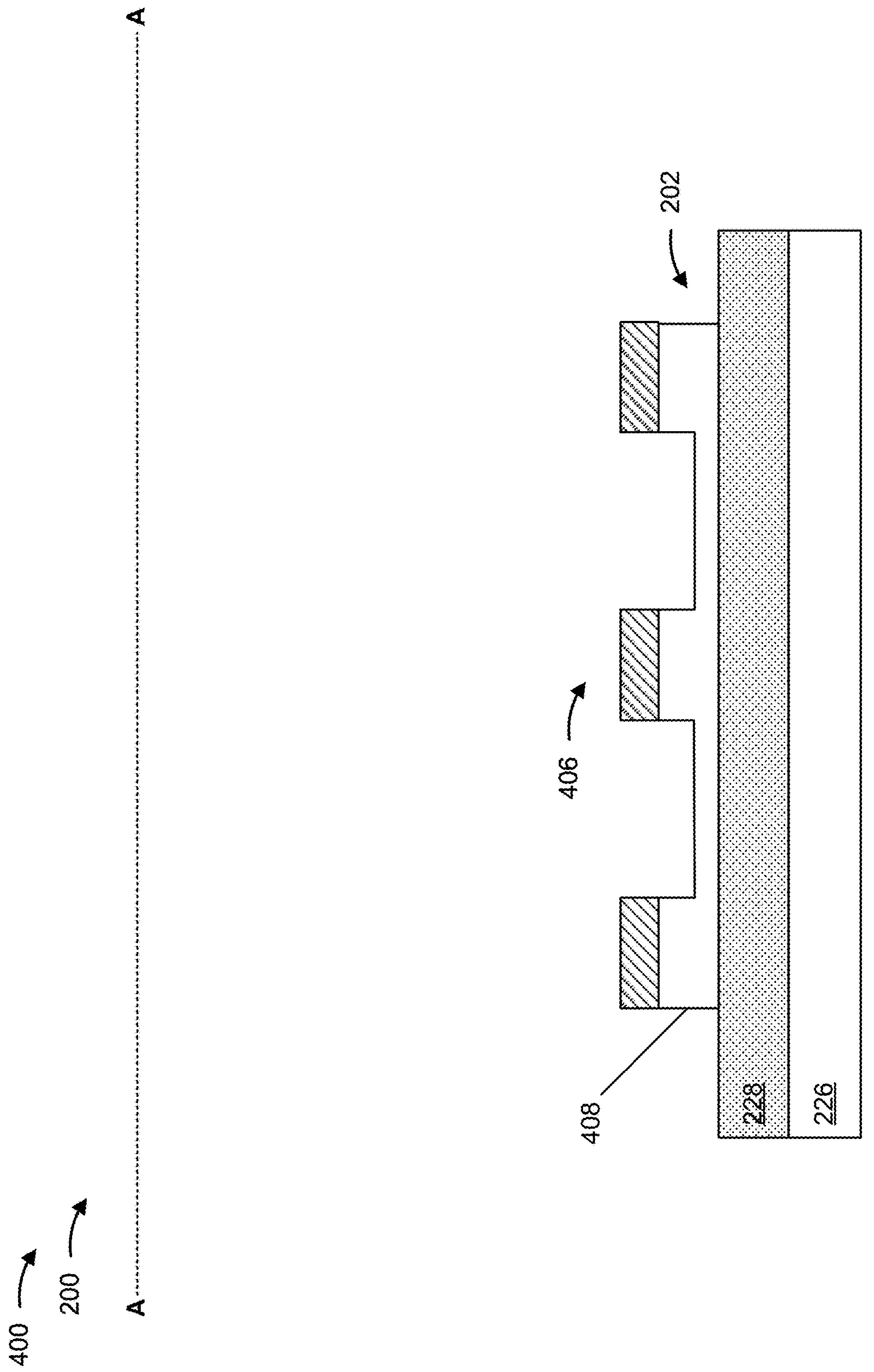
Figure 4C:
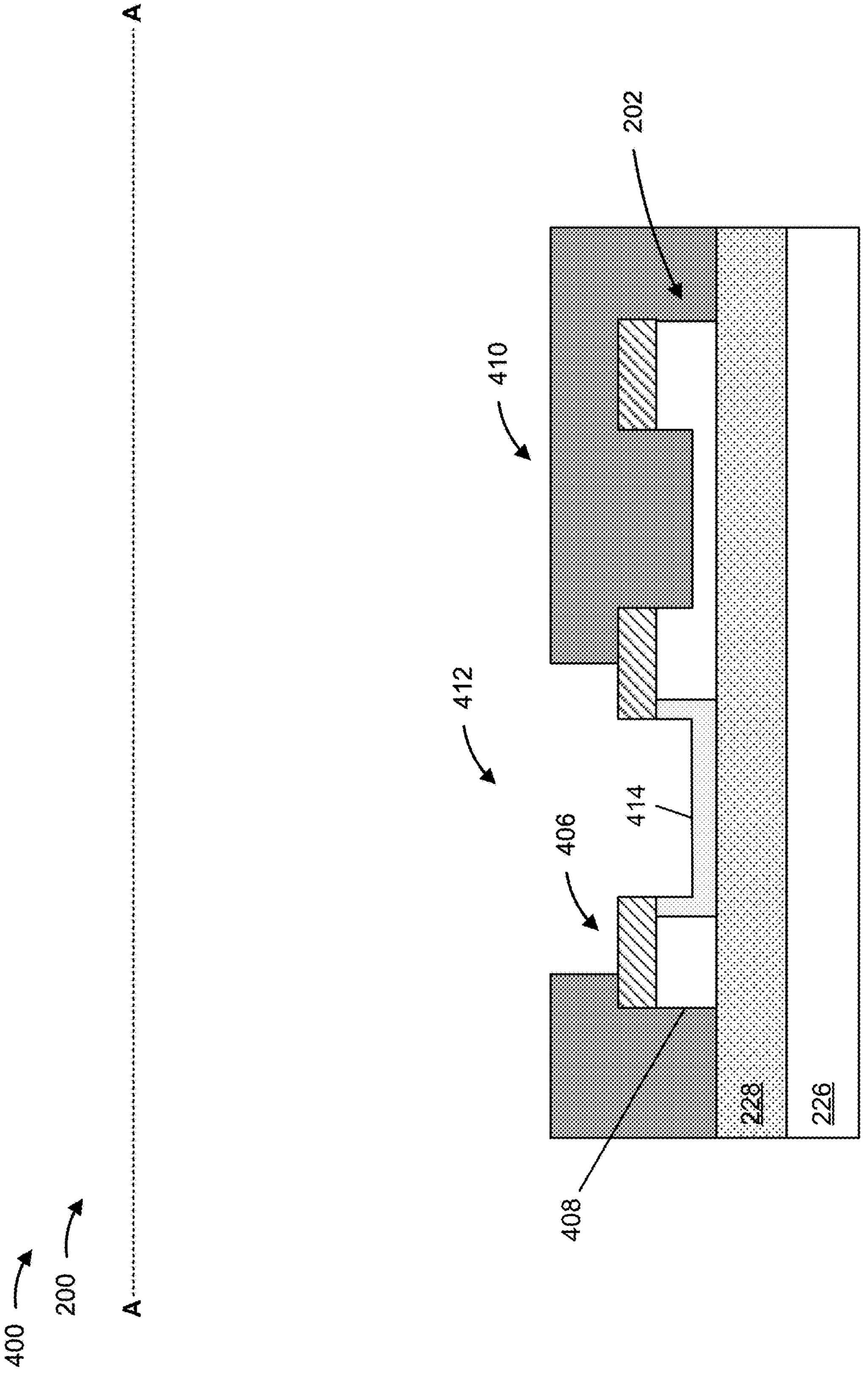
Figure 4D:
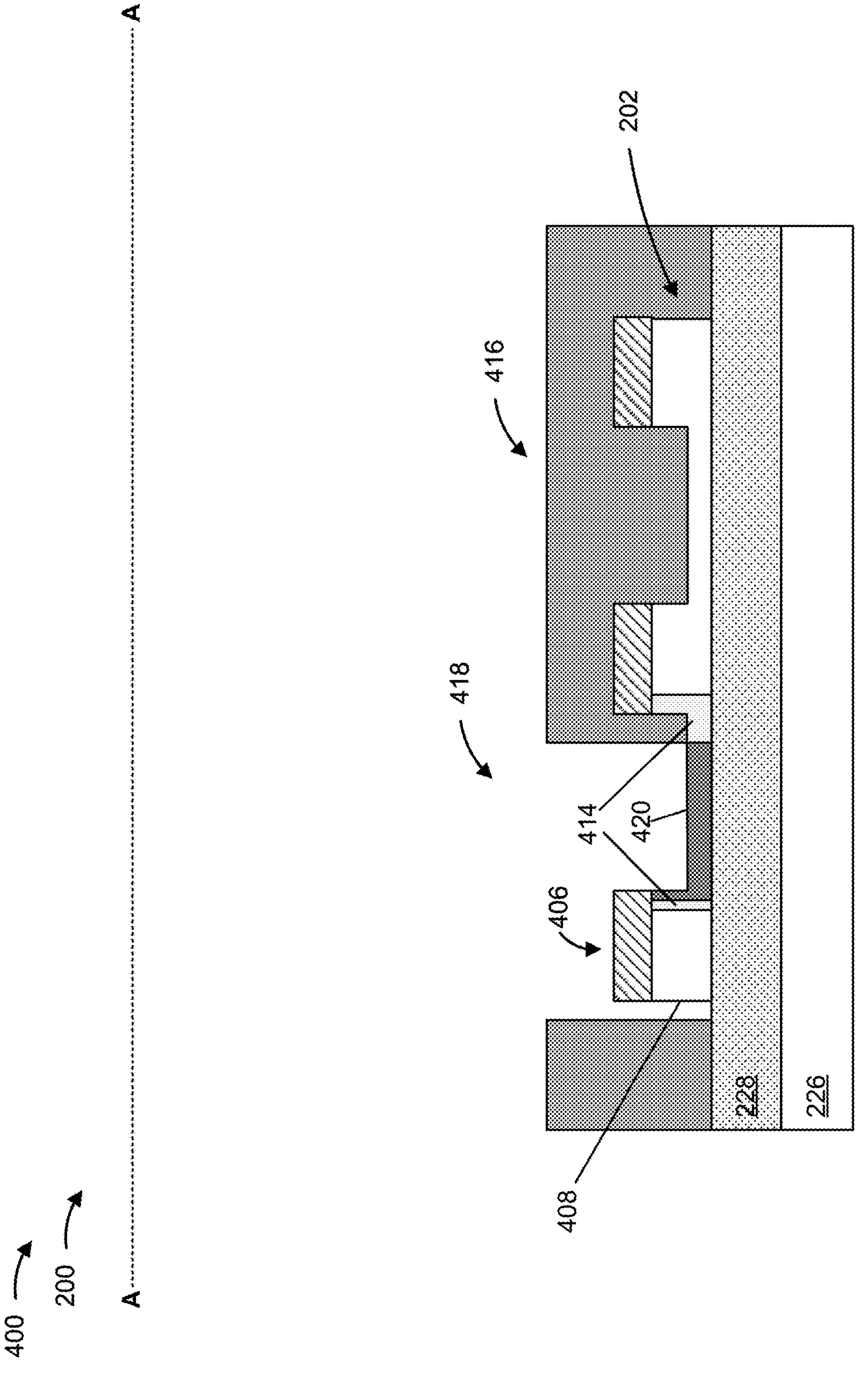
Figure 4E:
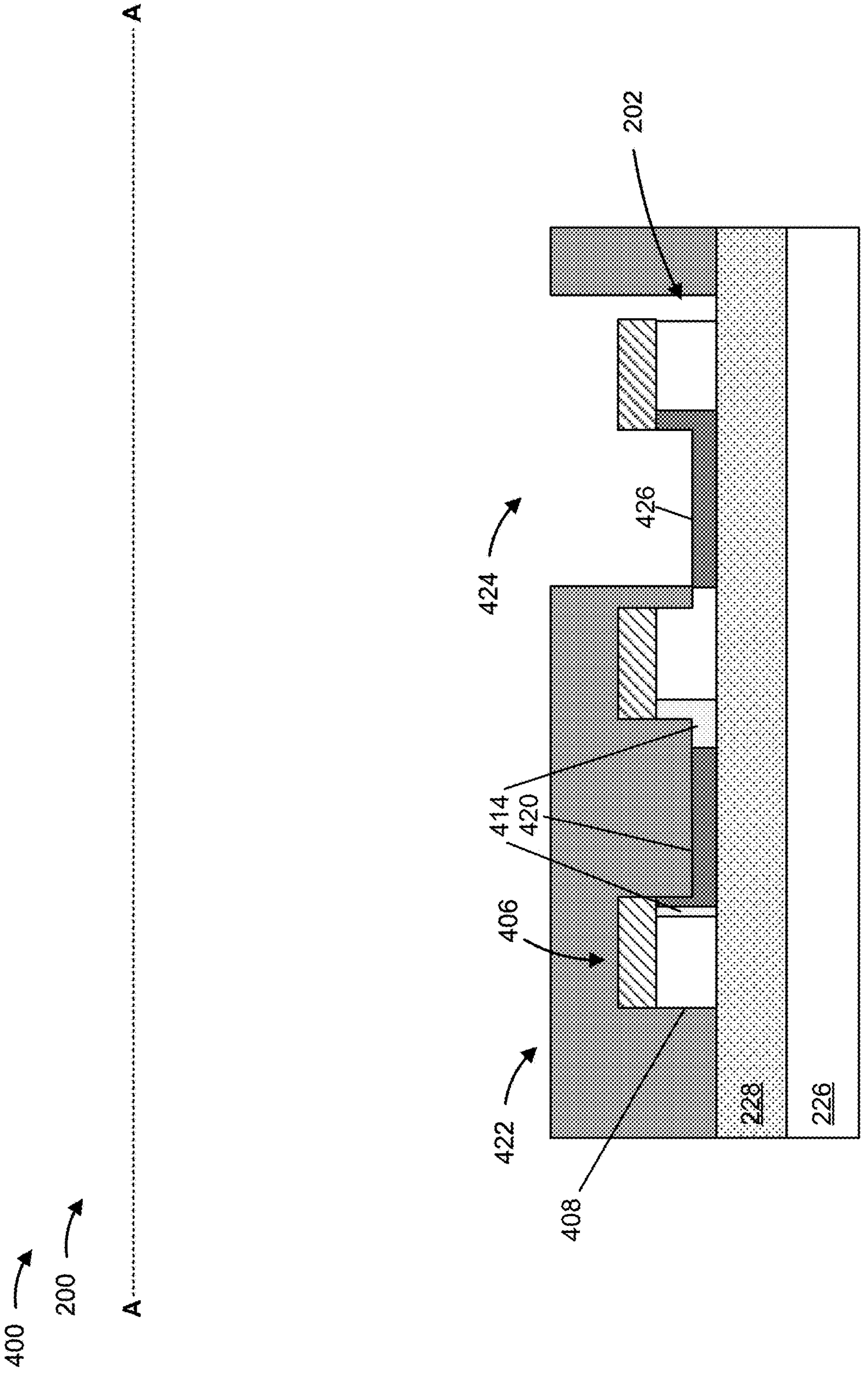
Figure 4F:
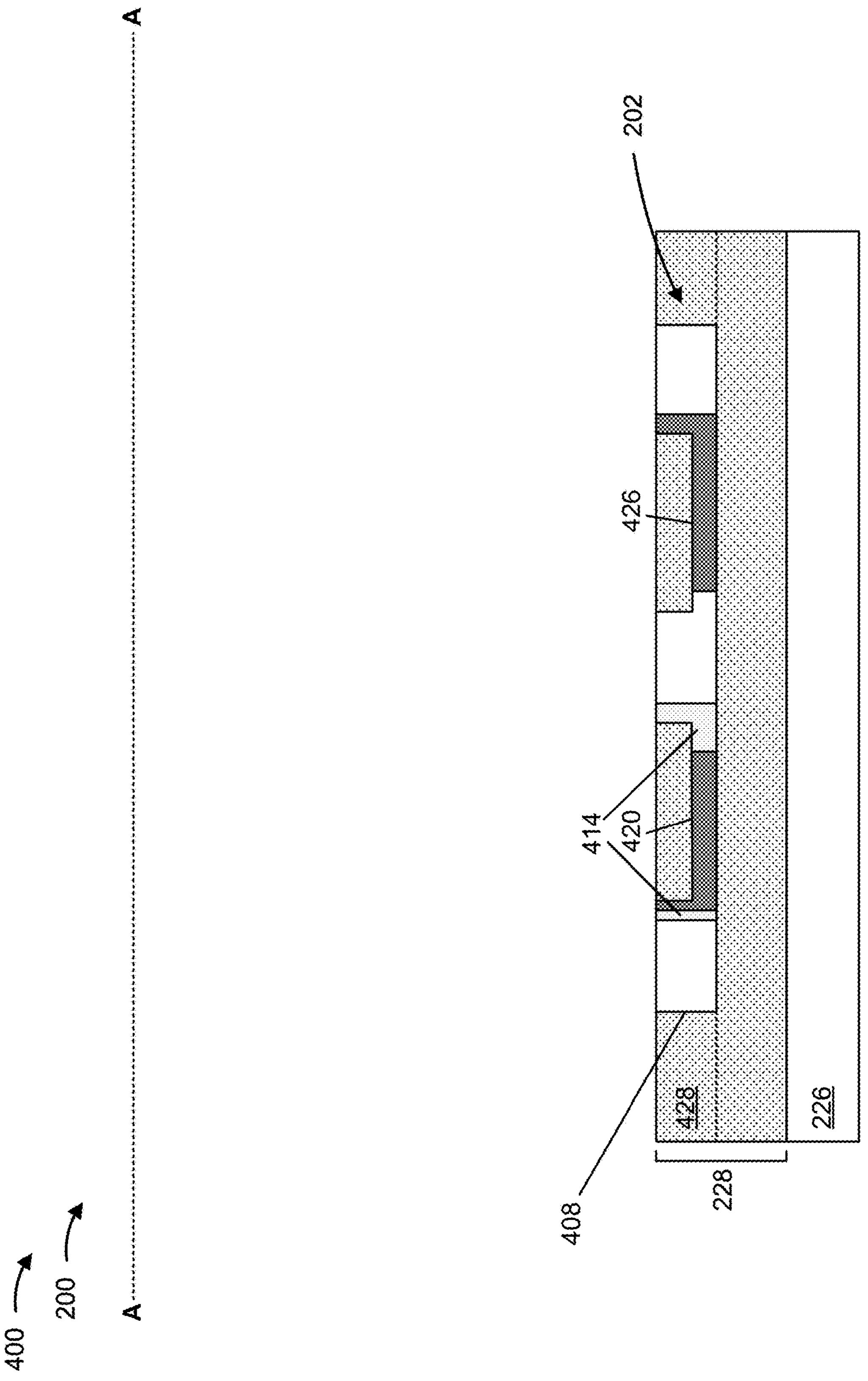
Figure 4G:
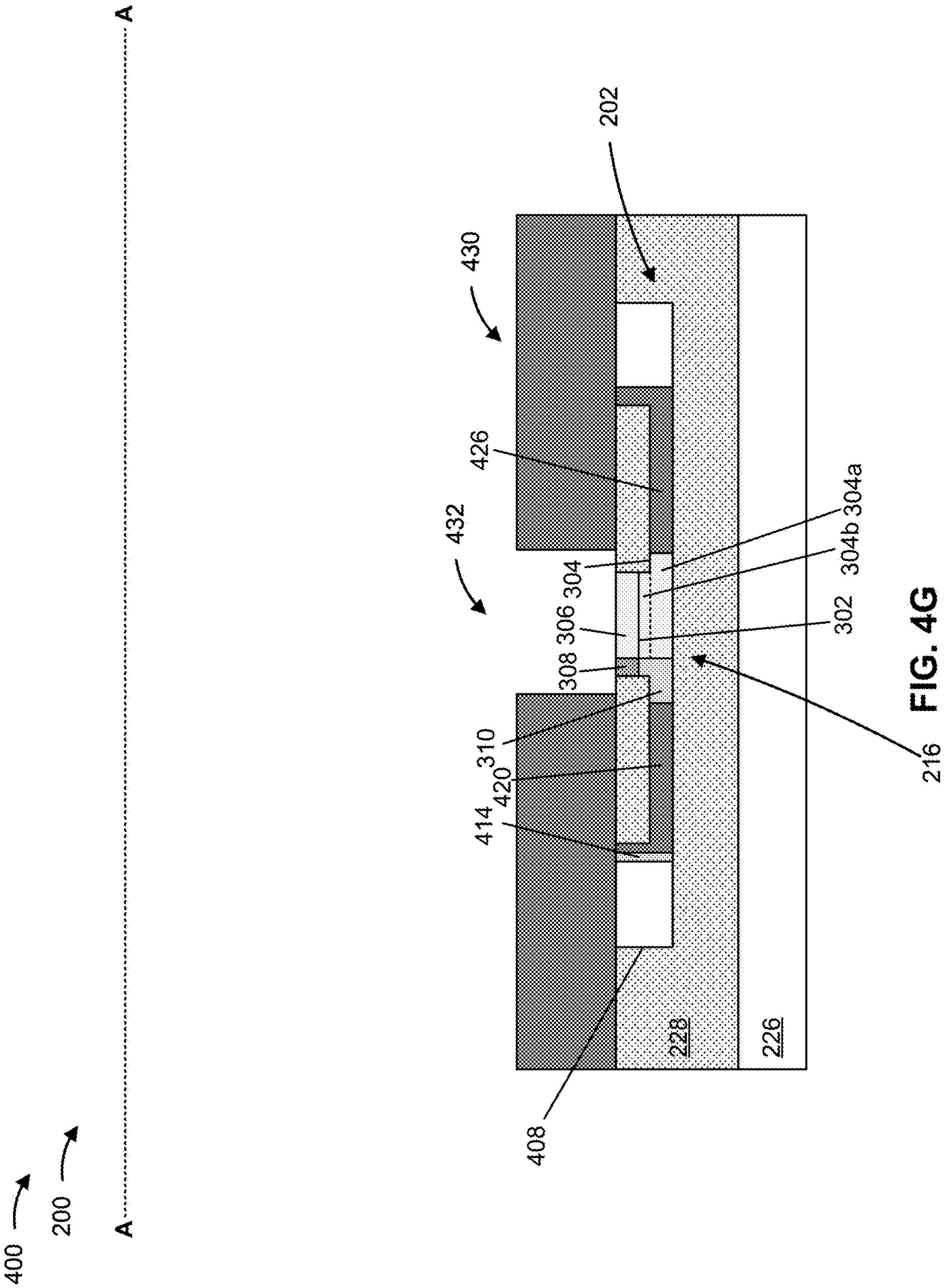
Figure 4H:
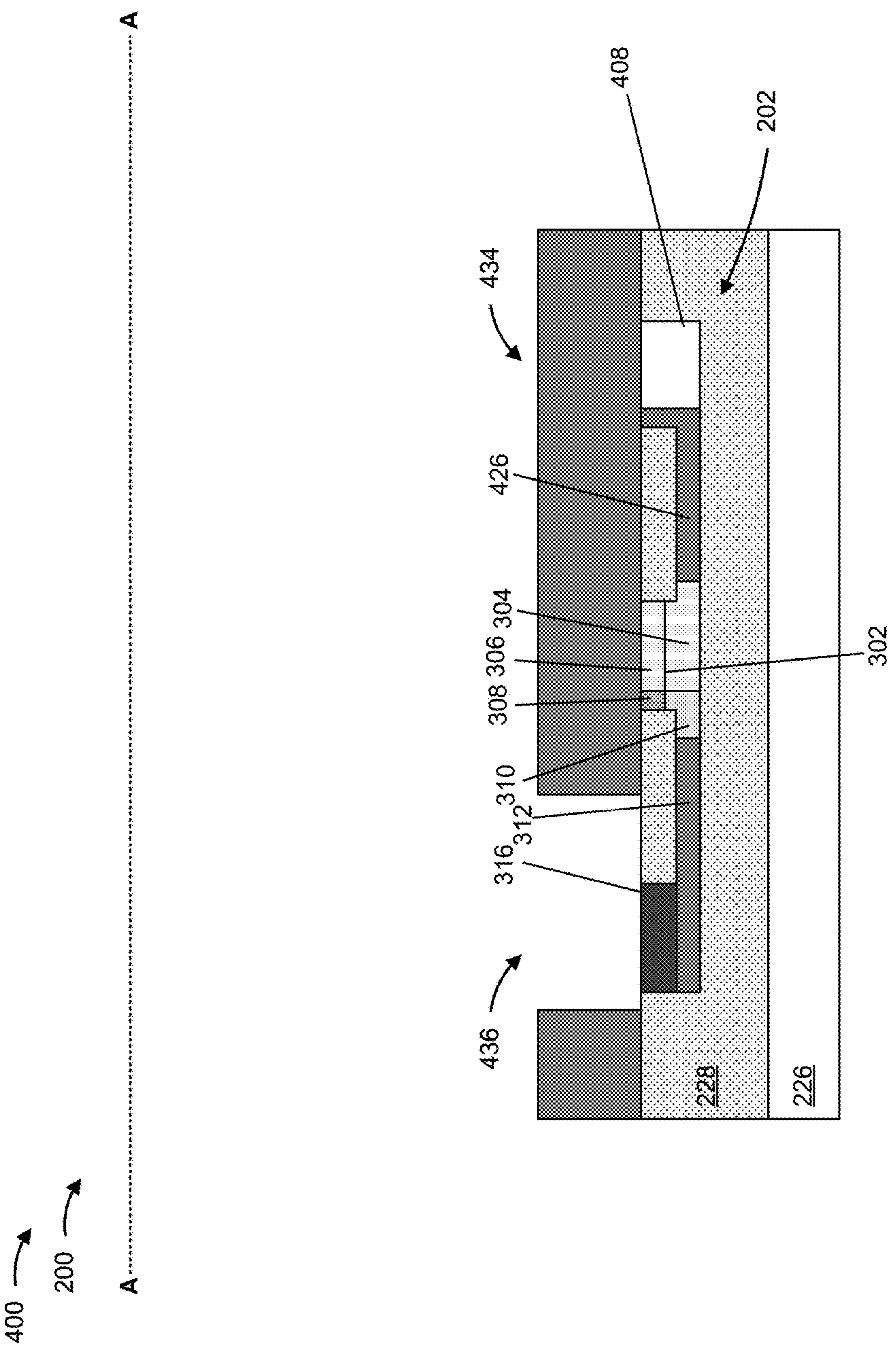
Figure 4I:
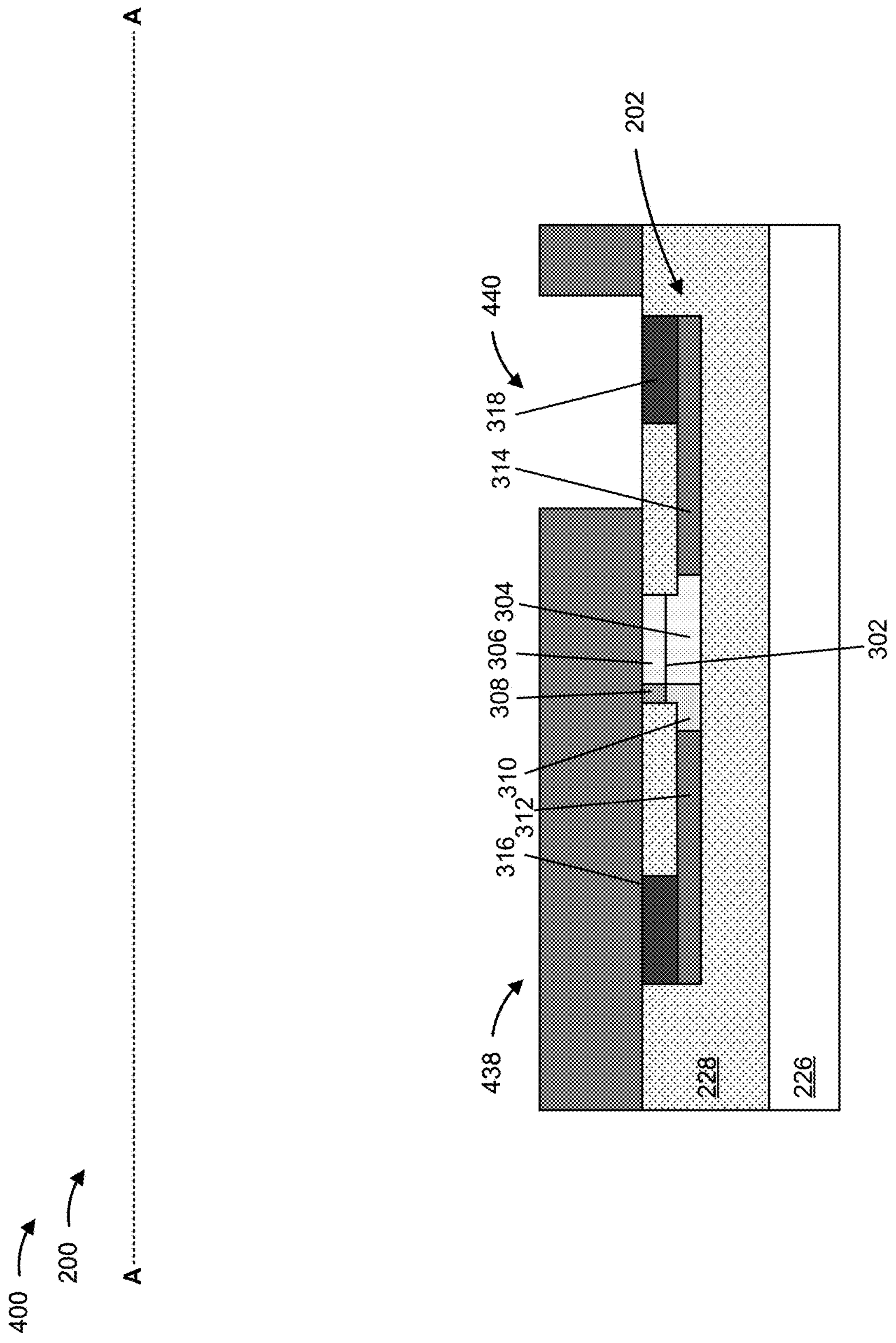
Figure 4J:
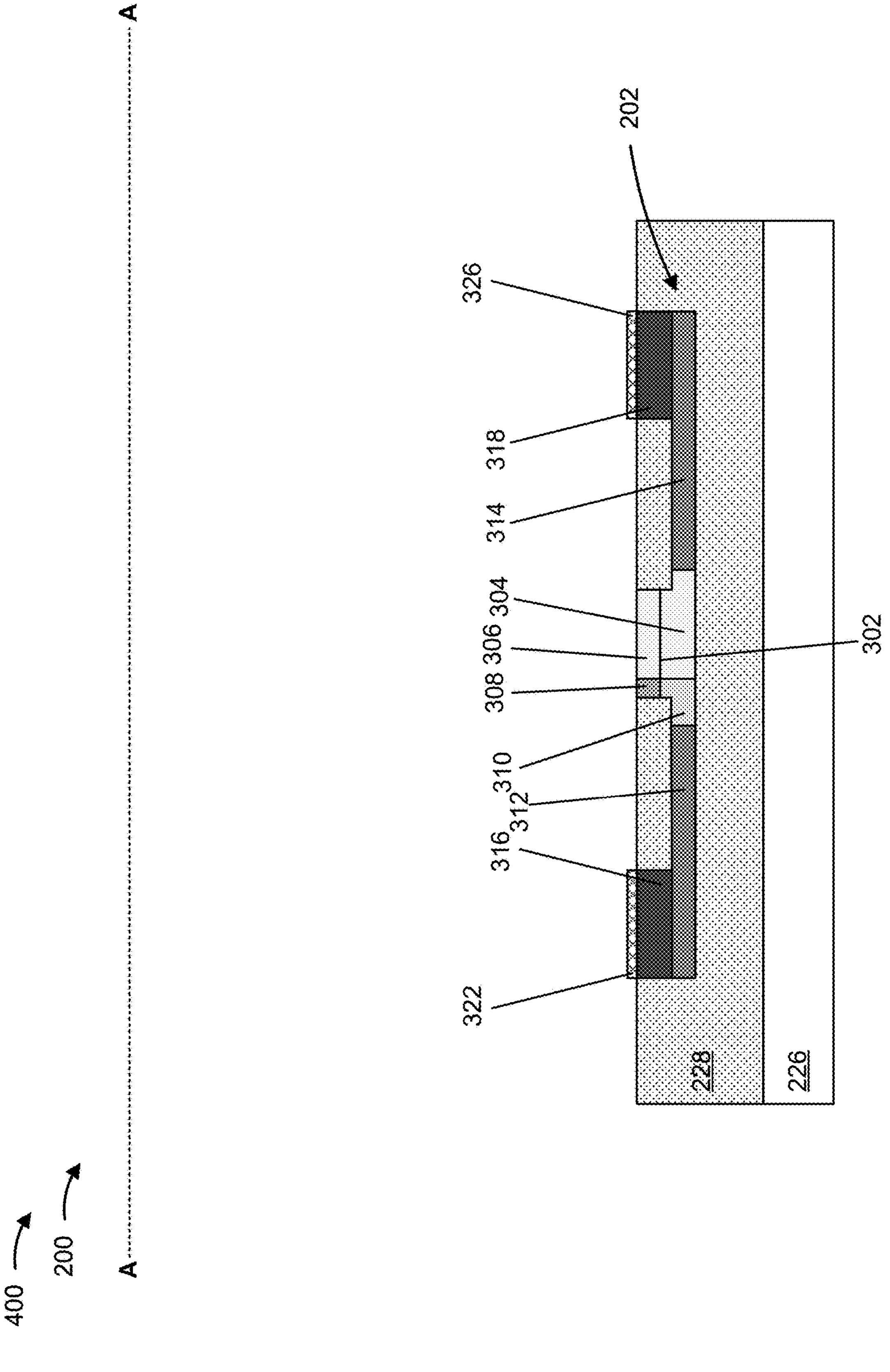
Figure 4K:
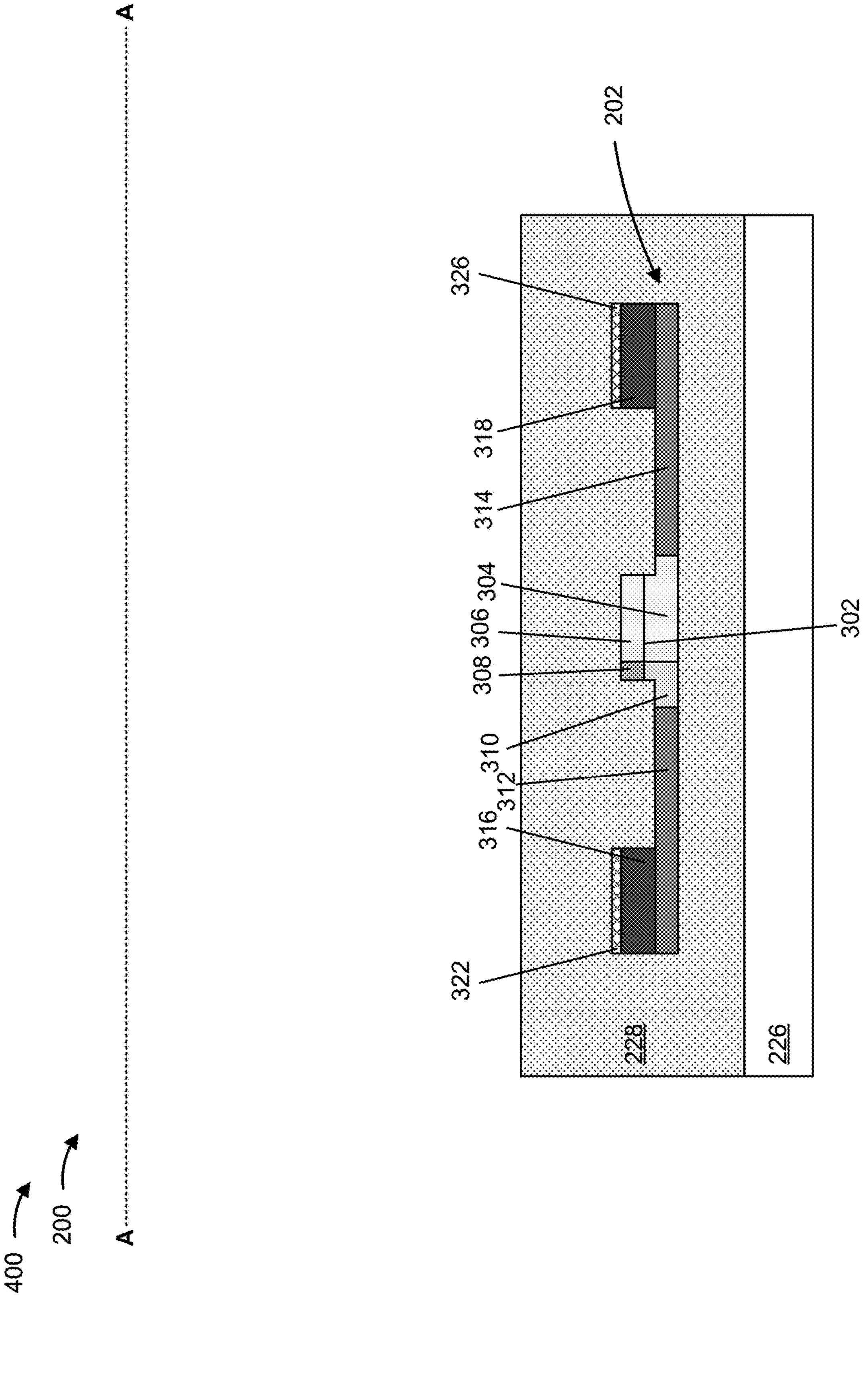
Figure 4L:
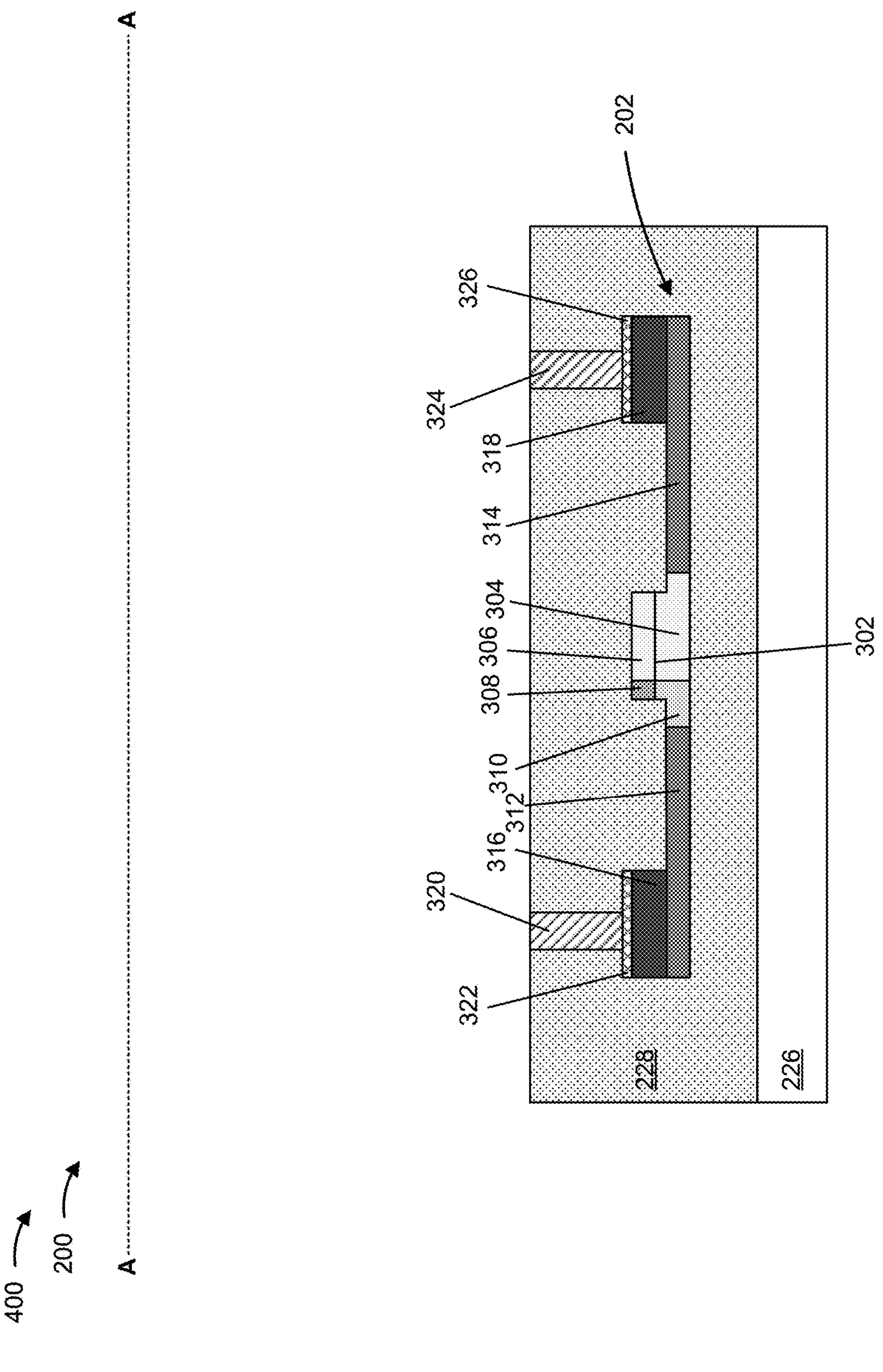
Figure 4M:
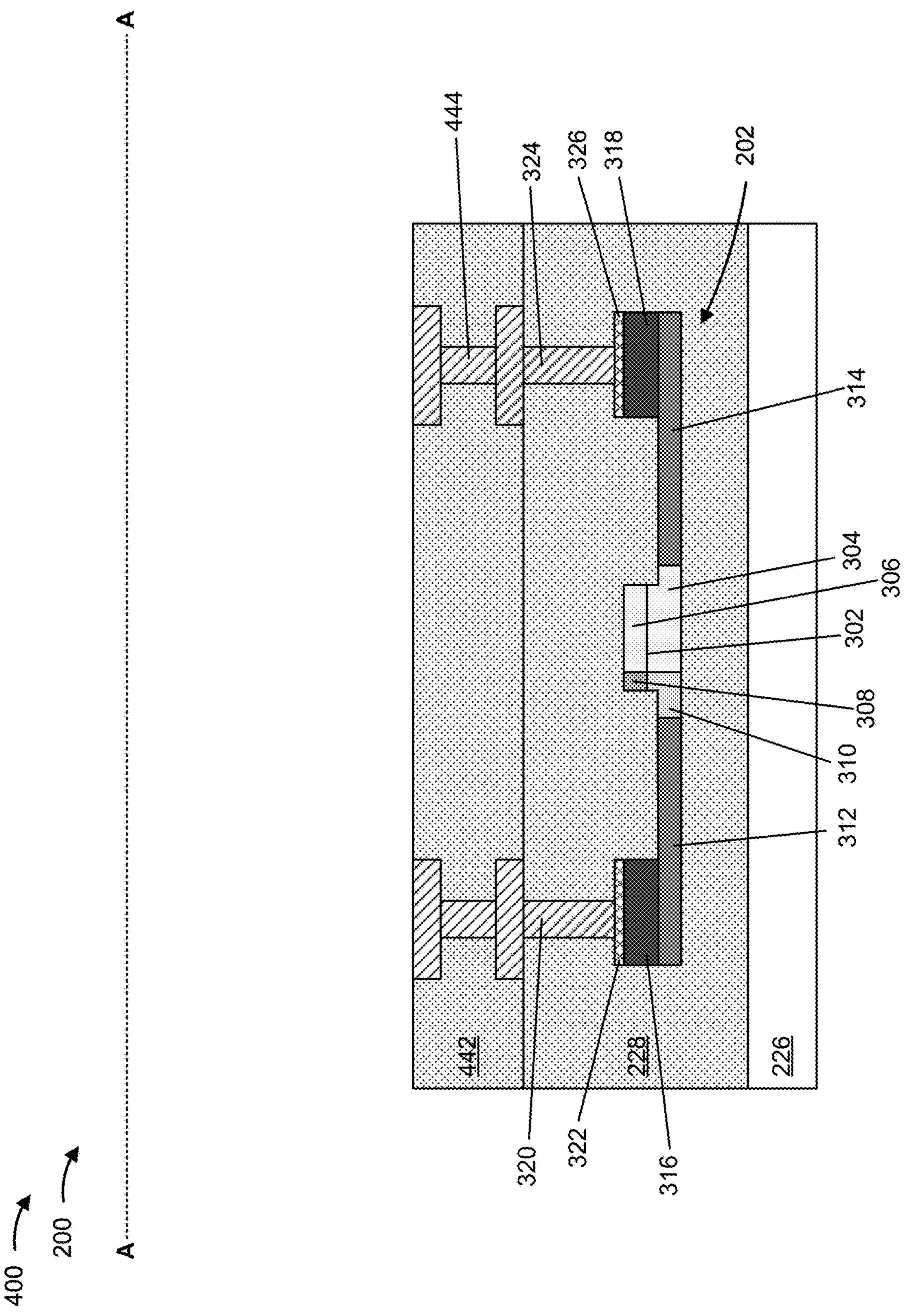
Figure 4N:
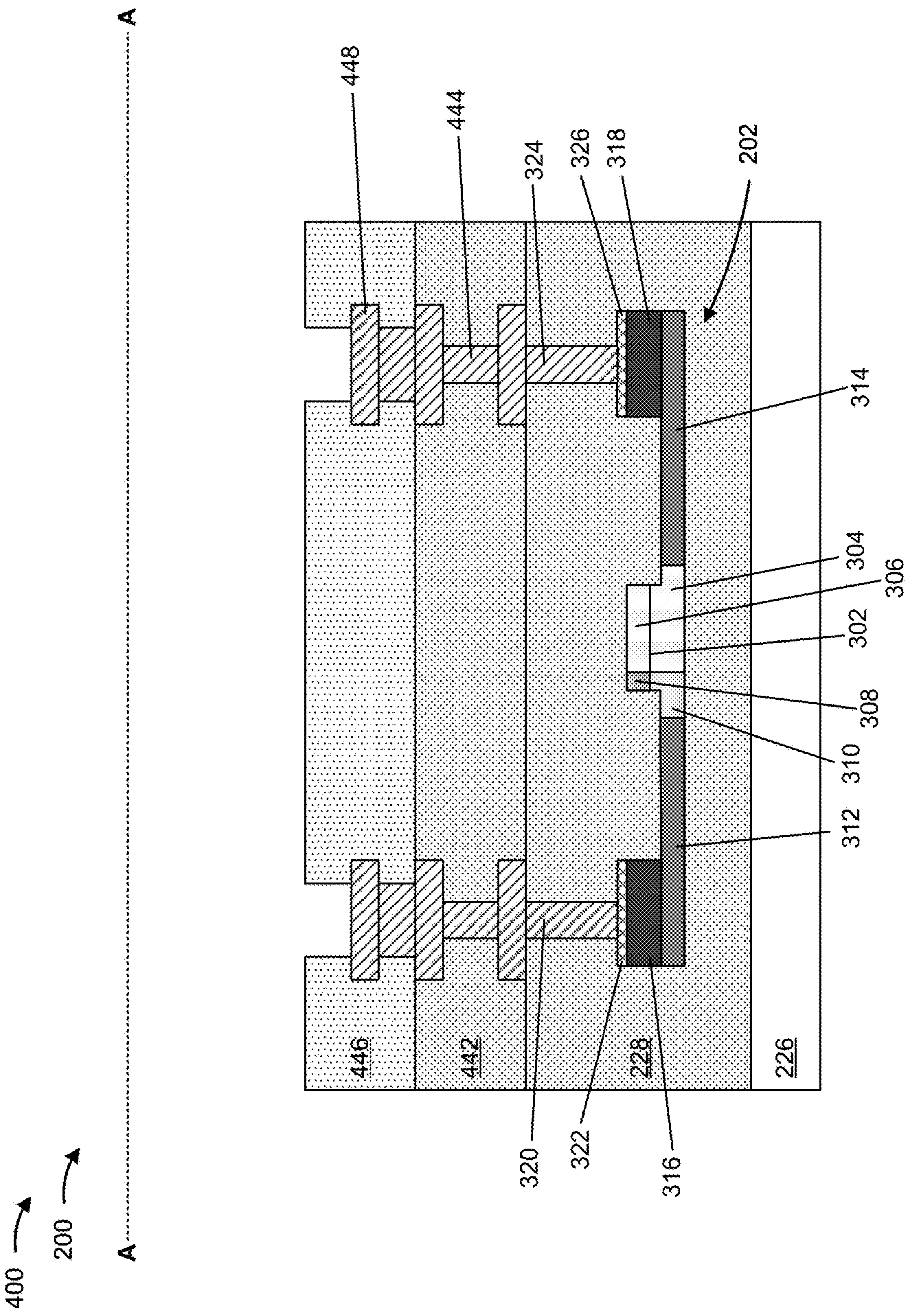

FIGS. 4A-4N are diagrams of an example implementation 400 of forming a semiconductor device (or a portion thereof) described herein. In particular, the example implementation 400 may include an example of forming an optical modulator structure 202 in a semiconductor device 200 and/or a semiconductor device 500, among other examples. In some implementations, one or more of the semiconductor processing operations described in connection with the example implementation 400 may be performed by one or more of the semiconductor processing tools 102-114 and/or by the wafer/die transport tool 116. In some implementations, one or more of the semiconductor processing operations described in connection with the example implementation 400 may be performed by another semiconductor processing tool.

Turning to FIG. 4A, a substrate 402 may be provided. The substrate 402 may include a silicon on insulator (SOI) substrate that includes the substrate 226 (e.g., a silicon (Si) substrate and/or another type of semiconductor substrate), the dielectric region 228 (e.g., a buried oxide or bottom oxide (BOX) layer and/or another type of insulator layer) over and/or on the substrate 226, and a semiconductor layer 404 (e.g., a silicon (Si) layer and/or another type of semiconductor layer) over and/or on the dielectric region 228. In some implementations, a thickness of the dielectric region 228 (e.g., the BOX layer), prior to formation of the optical modulator structure 202, may be included in a range of approximately 0.5 microns to approximately 3 microns. However, other values for the range are within the scope of the present disclosure.

Alternatively, the substrate 226 may be provided as a semiconductor wafer, and the deposition tool 102 may form the dielectric region 228 over and/or on the substrate 226, and may form the semiconductor layer 404 over and/or on the dielectric region 228. The deposition tool 102 may form the dielectric region 228 using a CVD technique, a PVD technique, an oxidation technique (e.g., a thermal oxidation technique), and/or another type of deposition technique. The deposition tool 102 may form the semiconductor layer 404 using a CVD technique, a PVD technique, an epitaxy technique, and/or another type of deposition technique.

As shown in FIG. 4B, a hard mask layer 406 may be formed over and/or on the semiconductor layer 404, and a pattern in the hard mask layer 406 may be used to form a semiconductor structure 408 (e.g., a silicon structure) of the optical modulator structure 202 from the semiconductor layer 404. The deposition tool 102 may form the hard mask layer 406 on the semiconductor layer 404 (e.g., using a CVD technique, a PVD technique, and/or another type of deposition technique), and may form a photoresist layer on the hard mask layer 406 (e.g., using a spin-coating technique and/or another type of deposition technique). The hard mask layer 406 may include a silicon nitride ($Si_xN_y$ such as $Si_3N_4$) material or another hard mask material. In some implementations, the hard mask layer 406 is formed to a thickness that is included in a range of approximately 500 angstroms to approximately 1500 angstroms. However, other values for the range are within the scope of the present disclosure.

The exposure tool 104 may expose the photoresist layer to a radiation source to form a pattern the photoresist layer. The developer tool 106 may develop and remove portions of the photoresist layer to expose the pattern. The etch tool 108 may etch the hard mask layer 406 to transfer the pattern from the photoresist layer to the hard mask layer 406. The etch tool 108 then etches the semiconductor layer 404 based on the pattern in the hard mask layer 406 to form the semiconductor structure 408 of the optical modulator structure 202 by removing portions of the semiconductor layer 404 based on the pattern. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique).

As shown in FIG. 4C, a photoresist layer 410 may be formed over and/or on the semiconductor structure 408 of the optical modulator structure 202. The deposition tool 102 may form the photoresist layer 410 using a spin-coating technique and/or another type of deposition technique. The exposure tool 104 may expose the photoresist layer 410 to a radiation source, and the developer tool 106 may develop and remove portions of the photoresist layer 410 to form a pattern 412 the photoresist layer 410.

As further shown in FIG. 4C, one or more portions of the semiconductor structure 408 of the optical modulator structure 202 may be doped with one or more types of dopants to form one or more doped semiconductor regions in the optical modulator structure 202. The ion implantation tool 114 may perform one or more doping operations or ion implantation operations using a combination of the hard mask layer 406 and the pattern 412 in the photoresist layer 410 as an implantation mask. The ion implantation tool 114 may use an ion implantation technique and/or another type of doping technique to implant dopants of a first dopant type (e.g., n-type dopants, p-type dopants) into a region 414 of the semiconductor structure 408 of the optical modulator structure 202 that is exposed through the hard mask layer 406 and through the pattern 412 in the photoresist layer 410. A photoresist removal tool may subsequently remove the remaining portions of the photoresist layer 410 (e.g., using a chemical stripper, plasma ashing, and/or another technique).

In some implementations, the first dopant type includes an n-type dopant such as phosphorous (P). In these implementations, an implantation energy that is included in a range of approximately 50 kiloelectronvolts (keV) to approximately 160 keV is used to implant the phosphorous ions into the semiconductor structure 408 of the optical modulator structure, and a dosage of the phosphorous ions that is used may be included in a range of approximately $1\times E^{14}$ phosphorous ions/$cm^3$ to approximately $6\times E^{14}$ phosphorous ions/$cm^3$. However, other values for these ranges are within the scope of the present disclosure.

In some implementations, the first dopant type includes an n-type dopant such as arsenic (As). In these implementations, an implantation energy that is included in a range of approximately 20 keV to approximately 60 keV is used to implant the arsenic ions into the semiconductor structure 408 of the optical modulator structure, and a dosage of the arsenic ions that is used may be included in a range of approximately $5\times E^{13}$ arsenic ions/$cm^3$ to approximately $5\times E^{14}$ arsenic ions/$cm^3$. However, other values for these ranges are within the scope of the present disclosure.

In some implementations, the ion implantation tool 114 bombards the surface of the semiconductor structure 408 of the optical modulator structure 202 at one or more angles to implant ions in exposed sidewalls of the semiconductor structure 408. Here, the implantation of ions in the sidewalls of the semiconductor structure 408 is self-aligned with the hard mask layer 406, meaning that the hard mask layer 406 functions as an implantation barrier on top of the semiconductor structure 408. The ion implantation tool 114 may implant ions in the sidewalls of the semiconductor structure 408 at a tilt angle that is included in a range of approximately 45 degrees to approximately-45 degrees. However, other values for the range are within the scope of the present disclosure. The tilt angle may refer to an angle of bombardment relative to an approximately perpendicular angle to the substrate 226. The ion implantation tool 114 may implant ions in the sidewalls of the semiconductor structure 408 to a depth that is included in a range of approximately 50 nanometers to approximately 150 nanometers. However, other values for the range are within the scope of the present disclosure.

As shown in FIG. 4D, another photoresist layer 416 may be formed over and/or on the semiconductor structure 408 of the optical modulator structure 202. The deposition tool 102 may form the photoresist layer 416 using a spin-coating technique and/or another type of deposition technique. The exposure tool 104 may expose the photoresist layer 416 to a radiation source, and the developer tool 106 may develop and remove portions of the photoresist layer 416 to form a pattern 418 the photoresist layer 416.

As further shown in FIG. 4D, one or more portions of the semiconductor structure 408 of the optical modulator structure 202 may be doped with one or more types of dopants to form one or more doped semiconductor regions in the optical modulator structure 202. The ion implantation tool 114 may perform one or more doping operations or ion implantation operations using a combination of the hard mask layer 406 and the pattern 418 in the photoresist layer 416 as an implantation mask. The ion implantation tool 114 may use an ion implantation technique and/or another type of doping technique to implant dopants of the first dopant type into a region 420 of the semiconductor structure 408 of the optical modulator structure 202 that is exposed through the hard mask layer 406 and through the pattern 418 in the photoresist layer 416. The region 420 may be included within the region 414 such that a dopant concentration in the region 420 is greater relative to a dopant concentration in the region 414. A photoresist removal tool may subsequently remove the remaining portions of the photoresist layer 416 (e.g., using a chemical stripper, plasma ashing, and/or another technique).

In some implementations, the first dopant type includes an n-type dopant such as phosphorous (P). In these implementations, an implantation energy that is included in a range of approximately 10 keV to approximately 50 keV is used to implant the phosphorous ions into the semiconductor structure 408 of the optical modulator structure, and a dosage of the phosphorous ions that is used may be included in a range of approximately $5\times E^{13}$ phosphorous ions/$cm^3$ to approximately $3\times E^{15}$ phosphorous ions/$cm^3$. However, other values for these ranges are within the scope of the present disclosure.

In some implementations, the ion implantation tool 114 bombards the surface of the semiconductor structure 408 of the optical modulator structure 202 at one or more angles to implant ions in exposed sidewalls of the semiconductor structure 408. Here, the implantation of ions in the sidewalls of the semiconductor structure 408 is self-aligned with the hard mask layer 406, meaning that the hard mask layer 406 functions as an implantation barrier on top of the semiconductor structure 408. The ion implantation tool 114 may implant ions in the sidewalls of the semiconductor structure 408 at a tilt angle that is included in a range of approximately 0 degrees to approximately 30 degrees. However, other values for the range are within the scope of the present disclosure.

As shown in FIG. 4E, another photoresist layer 422 may be formed over and/or on the semiconductor structure 408 of the optical modulator structure 202. The deposition tool 102 may form the photoresist layer 422 using a spin-coating technique and/or another type of deposition technique. The exposure tool 104 may expose the photoresist layer 422 to a radiation source, and the developer tool 106 may develop and remove portions of the photoresist layer 422 to form a pattern 424 the photoresist layer 422. The regions 414 and 420 that were doped with the first dopant type may remain covered by the photoresist layer 422 such that dopants of a second dopant type may be implanted into another region of the semiconductor structure 408 of the optical modulator structure 202.

As further shown in FIG. 4E, one or more portions of the semiconductor structure 408 of the optical modulator structure 202 may be doped with one or more types of dopants to form one or more doped semiconductor regions in the optical modulator structure 202. The ion implantation tool 114 may perform one or more doping operations or ion implantation operations using a combination of the hard mask layer 406 and the pattern 424 in the photoresist layer 422 as an implantation mask. The ion implantation tool 114 may use an ion implantation technique and/or another type of doping technique to implant dopants of the second dopant type into a region 426 of the semiconductor structure 408 of the optical modulator structure 202 that is exposed through the hard mask layer 406 and through the pattern 424 in the photoresist layer 422. A photoresist removal tool may subsequently remove the remaining portions of the photoresist layer 422 (e.g., using a chemical stripper, plasma ashing, and/or another technique).

In some implementations, the second dopant type includes a p-type dopant such as boron (B). In these implementations, an implantation energy that is included in a range of approximately 5 keV to approximately 30 keV is used to implant the boron ions into the semiconductor structure 408 of the optical modulator structure, and a dosage of the boron ions that is used may be included in a range of approximately $5\times E^{13}$ boron ions/$cm^3$ to approximately $3\times E^{15}$ boron ions/$cm^3$. However, other values for these ranges are within the scope of the present disclosure.

In some implementations, the ion implantation tool 114 bombards the surface of the semiconductor structure 408 of the optical modulator structure 202 at one or more angles to implant ions in exposed sidewalls of the semiconductor structure 408. Here, the implantation of ions in the sidewalls of the semiconductor structure 408 is self-aligned with the hard mask layer 406, meaning that the hard mask layer 406 functions as an implantation barrier on top of the semiconductor structure 408. The ion implantation tool 114 may implant ions in the sidewalls of the semiconductor structure 408 at a tilt angle that is included in a range of approximately 0 degrees to approximately 30 degrees. However, other values for the range are within the scope of the present disclosure.

As shown in FIG. 4F, additional material for the dielectric region 228 may be deposited to encapsulate the semiconductor structure 408 of the optical modulator structure 202 in the dielectric region 228. The deposition tool 102 may deposit an STI region 428 as the additional material for the dielectric region 228 using a CVD technique, a PVD technique, an oxidation technique (e.g., a thermal oxidation technique), and/or another type of deposition technique. In some implementations, one or more additional semiconductor processing operation may be performed to deposit the additional material of the dielectric region 228. For example, the deposition tool 102 may perform an STI liner oxidation operation and/or a high density plasma (HDP) deposition operation to deposit the additional material of the dielectric region 228. As another example, the planarization tool 110 may perform a CMP operation and/or another type of planarization operation to planarize the dielectric region 228 after the additional material of the dielectric region 228 is deposited. The planarization tool 110 may perform a CMP operation and/or another type of planarization operation to planarize the dielectric region 228 such that the top surface of the optical modulator structure 202 is exposed through the dielectric region 228. The CMP operation may remove the hard mask layer 406 from the optical modulator structure 202. Additionally and/or alternatively, the etch tool 108 may remove the hard mask layer 406 by dry and/or wet/chemical etching.

As shown in FIG. 4G, another photoresist layer 430 may be formed over and/or on the semiconductor structure 408 of the optical modulator structure 202. The deposition tool 102 may form the photoresist layer 430 using a spin-coating technique and/or another type of deposition technique. The exposure tool 104 may expose the photoresist layer 430 to a radiation source, and the developer tool 106 may develop and remove portions of the photoresist layer 430 to form a pattern 432 the photoresist layer 430. The region of the optical modulator structure 202 in which the P-N junction diode 216 is to be formed may be exposed through the pattern 432.

As further shown in FIG. 4G, one or more portions of the semiconductor structure 408 of the optical modulator structure 202 may be doped with one or more types of dopants to form the P-N junction diode 216 in the optical modulator structure 202. The ion implantation tool 114 may perform one or more doping operations or ion implantation operations using the pattern 432 in the photoresist layer 430 as an implantation mask. The ion implantation tool 114 may use an ion implantation technique and/or another type of doping technique to implant dopants of the second dopant type into a region 304 of the optical modulator structure 202. The ion implantation tool 114 may use an ion implantation technique and/or another type of doping technique to implant dopants of the first dopant type into a region 306 of the optical modulator structure 202 over and/or on the region 304. Doping of the region 306 may result in additional dopants being implanted into a portion of the adjacent region 414, which may result in formation of a region 308 and a region 310. The dopant concentration in the region 308 may be greater relative to the dopant concentration in the region 306 and in the region 310 because of the exposure of the region 308 to multiple doping operations. A photoresist removal tool may subsequently remove the remaining portions of the photoresist layer 422 (e.g., using a chemical stripper, plasma ashing, and/or another technique).

In some implementations, the region 304 is doped in a plurality of doping operations. For example, a portion 304*a* of the region 304 may doped in a first doping operation, and a portion 304*b* above the portion 304*a* may be doped in a second doping operation after the first doping operation. A third doping operation may be performed after the second doping operation to dope the region 306 and the region 308. The portion 304*a* may be coupled with the region 426, and a portion 304*b* may be coupled with the region 306. The use of the first doping operation may improve the connection between the region 304 and the region 426 (which may subsequently formed into a region 314). The use of the second doping operation and the third doping operation may enable precise control over the location of an interface 302 between the region 304 and the region 306.

In some implementations, the first doping operation (e.g., a first ion implantation operation) may include doping the region 304 with a p-type dopant such as boron (B). In these implementations, an implantation energy that is included in a range of approximately 30 keV to approximately 50 keV is used to implant the boron ions into the semiconductor structure 408 of the optical modulator structure, and a dosage of the boron ions that is used may be included in a range of approximately $5\times E^{13}$ boron ions/$cm^3$ to approximately $5\times E^{14}$ boron ions/$cm^3$. However, other values for these ranges are within the scope of the present disclosure. In some implementations, a tilt angle of approximately 0 degrees is used in the first doping operation. However, other values are within the scope of the present disclosure.

In some implementations, the second doping operation (e.g., a second ion implantation operation) may include doping the region 304 with a p-type dopant such as boron (B). In these implementations, an implantation energy that is included in a range of approximately 50 keV to approximately 70 keV is used to implant the boron ions into the semiconductor structure 408 of the optical modulator structure, and a dosage of the boron ions that is used may be included in a range of approximately $5\times E^{13}$ boron ions/$cm^3$ to approximately $5\times E^{14}$ boron ions/$cm^3$. However, other values for these ranges are within the scope of the present disclosure. In some implementations, a tilt angle of approximately 0 degrees is used in the second doping operation. However, other values are within the scope of the present disclosure.

In some implementations, the third doping operation (e.g., a third ion implantation operation) may include doping the region 304 with an n-type dopant such as phosphorous (P). In these implementations, an implantation energy that is included in a range of approximately 30 keV to approximately 50 keV is used to implant the phosphorous ions into the semiconductor structure 408 of the optical modulator structure, and a dosage of the phosphorous ions that is used may be included in a range of approximately $8\times E^{13}$ phosphorous ions/$cm^3$ to approximately $8\times E^{14}$ phosphorous ions/$cm^3$. However, other values for these ranges are within the scope of the present disclosure. In some implementations, a tilt angle of approximately 0 degrees is used in the third doping operation. However, other values are within the scope of the present disclosure.

In general, the dopant concentration in the regions 310, 308, and 306 may be greater relative to the dopant concentration in the region 304. In some implementations, a rapid thermal anneal (RTA) operation and/or a furnace thermal activation operation is used to anneal the semiconductor structure 408 of the optical modulator structure 202 to facilitate activation and/or absorption of dopants in the regions 304, 306, 308, and/or 310.

As further shown in FIG. 4H, one or more portions of the semiconductor structure 408 of the optical modulator structure 202 may be doped with one or more types of dopants to form a region 312 and a region 316 in the optical modulator structure 202. The region 312 may include at least a portion of the region 414, at least a portion of the region 420, and/or an undoped portion of the semiconductor structure 408 of the optical modulator structure. The region 316 may include at least a portion of the region 414 and/or an undoped portion of the semiconductor structure 408 of the optical modulator structure.

The ion implantation tool 114 may perform one or more doping operations or ion implantation operations using a photoresist layer 434 that includes a pattern 436. The photoresist layer 434 may be used as an implantation mask. The ion implantation tool 114 may use an ion implantation technique and/or another type of doping technique to implant dopants of the first dopant type (e.g., an n-type dopant such as phosphorous (P) or arsenic (As), among other examples). A photoresist removal tool may subsequently remove the remaining portions of the photoresist layer 434 (e.g., using a chemical stripper, plasma ashing, and/or another technique). In some implementations, a rapid thermal anneal (RTA) operation and/or a furnace thermal activation operation is used to anneal the semiconductor structure 408 of the optical modulator structure 202 to facilitate activation and/or absorption of dopants in the regions 312 and/or 316.

As further shown in FIG. 4I, one or more portions of the semiconductor structure 408 of the optical modulator structure 202 may be doped with one or more types of dopants to form a region 314 and a region 318 in the optical modulator structure 202. The region 314 may include at least a portion of the region 426 and/or an undoped portion of the semiconductor structure 408 of the optical modulator structure. The region 318 may include at least a portion of the region 426 and/or an undoped portion of the semiconductor structure 408 of the optical modulator structure.

The ion implantation tool 114 may perform one or more doping operations or ion implantation operations using a photoresist layer 438 that includes a pattern 440. The photoresist layer 438 may be used as an implantation mask. The ion implantation tool 114 may use an ion implantation technique and/or another type of doping technique to implant dopants of the second dopant type (e.g., a p-type dopant such as boron (B), among other examples). A photoresist removal tool may subsequently remove the remaining portions of the photoresist layer 438 (e.g., using a chemical stripper, plasma ashing, and/or another technique). In some implementations, a rapid thermal anneal (RTA) operation and/or a furnace thermal activation operation is used to anneal the semiconductor structure 408 of the optical modulator structure 202 to facilitate activation and/or absorption of dopants in the regions 314 and/or 318.

As shown in FIG. 4J, a silicide layer 322 may be formed over and/or on the top surface of the region 316, and a silicide layer 326 may be formed over and/or on the top surface of the region 318. The silicide layer 322 and the silicide layer 326 may each include a metal silicide layer. The deposition tool 102 may deposit the silicide layer 322 and the silicide layer 326 using a CVD technique, a PVD technique, an ALD technique, a silicidation technique, and/or another deposition technique. In some implementations, the deposition tool 102 may perform a pre-clean operation to remove oxides (e.g., native oxides) from the top surface of the region 316 and from the top surface of the region 318 prior to formation of the silicide layer 322 and the silicide layer 326.

As shown in FIG. 4K, one or more additional layers of the dielectric region 228 may be formed after formation of the optical modulator structure 202. For example, one or more additional layers of the dielectric region 228 may be formed (e.g., using one or more techniques described above in connection with FIG. 4F) such that the optical modulator structure 202 is encapsulated in the dielectric region 228. In some implementations, the planarization tool 110 planarizes the dielectric region 228 after the deposition tool 102 deposits the one or more additional layers of the dielectric region 228.

As shown in FIG. 4L, a contact structure 320 and a contact structure 324 may be formed in the dielectric region 228. The contact structure 320 may be formed over the region 316 and on the silicide layer 322. The contact structure 324 may be formed over the region 318 and on the silicide layer 326. The contact structure 320 and the contact structure 324 may be formed in recesses that are respectively formed over the region 318 and the region 318. In some implementations, a pattern in a photoresist layer is used to etch the dielectric region 228 to form the recesses in the dielectric region 228. In these implementations, the deposition tool 102 forms the photoresist layer on the dielectric region 228. The exposure tool 104 exposes the photoresist layer to a radiation source to pattern the photoresist layer. The developer tool 106 develops and removes portions of the photoresist layer to expose the pattern. The etch tool 108 etches the dielectric region 228 based on the pattern to form the recesses in the dielectric region 228. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for etching the dielectric region 228 based on a pattern.

The deposition tool 102 and/or the plating tool 112 may deposit the contact structure 320 and the contact structure 324 in the recesses. The deposition tool 102 and/or the plating tool 112 may use a CVD technique, a PVD technique, an ALD technique, an electroplating technique, another deposition technique described above in connection with FIG. 1, and/or another suitable deposition technique to deposit the contact structure 320 and the contact structure 324.

As shown in FIG. 4M, a dielectric region 442 may be formed over and/or on the dielectric region 228. The deposition tool 102 may deposit one or more dielectric layers of the dielectric region 442 using a CVD technique, a PVD technique, an oxidation technique (e.g., a thermal oxidation technique), and/or another type of deposition technique.

As further shown in FIG. 4M, one or more metallization layers 444 may be formed in (and included in) the dielectric region 442. The metallization layer(s) 444 may include tungsten (W), cobalt (Co), ruthenium (Ru), titanium (Ti), aluminum (Al), copper (Cu) or gold (Au), among other examples of conductive materials. The metallization layer(s) 444 may include vias, trenches, contact plugs, and/or another type of metallization layers. The deposition tool 102 and/or the plating tool 112 may deposit the one or more metallization layer(s) 444 in a CVD operation, a PVD operation, an ALD operation, an electroplating operation, another deposition operation described above in connection with FIG. 1, and/or another suitable deposition operation. In some implementations, a seed layer is first deposited, and metallization layer(s) 444 are deposited on the seed layer. In some implementations, the planarization tool 110 planarizes the metallization layer(s) 444 after the metallization layer(s) 444 are deposited.

In some implementations, the dielectric region 442 includes a plurality of metallization layers 444. For example, the deposition tool 102 may form a first dielectric layer of the dielectric region 442 on the dielectric region 228. The etch tool 108 may remove portions of the first layer of the dielectric region 442 to expose the contact structure 320 and the contact structure 324, and the deposition tool 102 and/or the plating tool 112 may form a first metallization layer 444 over and/or on the contact structure 320 and the contact structure 324. The deposition tool 102 may form a second dielectric layer of the dielectric region 442 on the first dielectric layer of the dielectric region 442. The etch tool 108 may remove portions of the second layer of the dielectric region 442 to expose the first metallization layer 444, and the deposition tool 102 and/or the plating tool 112 may form a second metallization layer 444 over and/or on the first metallization layer 444. Additional dielectric layers of the dielectric region 442 and/or additional metallization layers 444 may be formed until a sufficient or target quantity of metallization layers 444 is formed.

As shown in FIG. 4N, a dielectric region 446 may be formed over and/or on the dielectric region 442. The deposition tool 102 may deposit one or more dielectric layers of the dielectric region 446 using a CVD technique, a PVD technique, an oxidation technique (e.g., a thermal oxidation technique), and/or another type of deposition technique.

As further shown in FIG. 4N, one or more metallization layers 448 may be formed in (and included in) the dielectric region 446. The metallization layer(s) 448 may include tungsten (W), cobalt (Co), ruthenium (Ru), titanium (Ti), aluminum (Al), copper (Cu) or gold (Au), among other examples of conductive materials. The metallization layer(s) 448 may include vias, trenches, contact plugs, conductive pads, and/or another type of metallization layers. The deposition tool 102 and/or the plating tool 112 may deposit the one or more metallization layer(s) 448 in a CVD operation, a PVD operation, an ALD operation, an electroplating operation, another deposition operation described above in connection with FIG. 1, and/or another suitable deposition operation. In some implementations, a seed layer is first deposited, and metallization layer(s) 448 are deposited on the seed layer. In some implementations, the planarization tool 110 planarizes the metallization layer(s) 448 after the metallization layer(s) 448 are deposited.

In some implementations, the dielectric region 446 includes a plurality of metallization layers 448. For example, the deposition tool 102 may form a first dielectric layer of the dielectric region 446 on the dielectric region 442. The etch tool 108 may remove portions of the first layer of the dielectric region 446 to expose a top metallization layer 444 in the dielectric region 442, and the deposition tool 102 and/or the plating tool 112 may form a first metallization layer 448 over and/or on the top metallization layer 444. The deposition tool 102 may form a second dielectric layer of the dielectric region 446 on the first dielectric layer of the dielectric region 446. The etch tool 108 may remove portions of the second layer of the dielectric region 446 to expose the first metallization layer 448, and the deposition tool 102 and/or the plating tool 112 may form a second metallization layer 448 over and/or on the first metallization layer 448. Additional dielectric layers of the dielectric region 446 and/or additional metallization layers 448 may be formed until a sufficient or target quantity of metallization layers 448 is formed.

As indicated above, FIGS. 4A-4N are provided as an example. Other examples may differ from what is described with regard to FIGS. 4A-4N.

Figure 5:
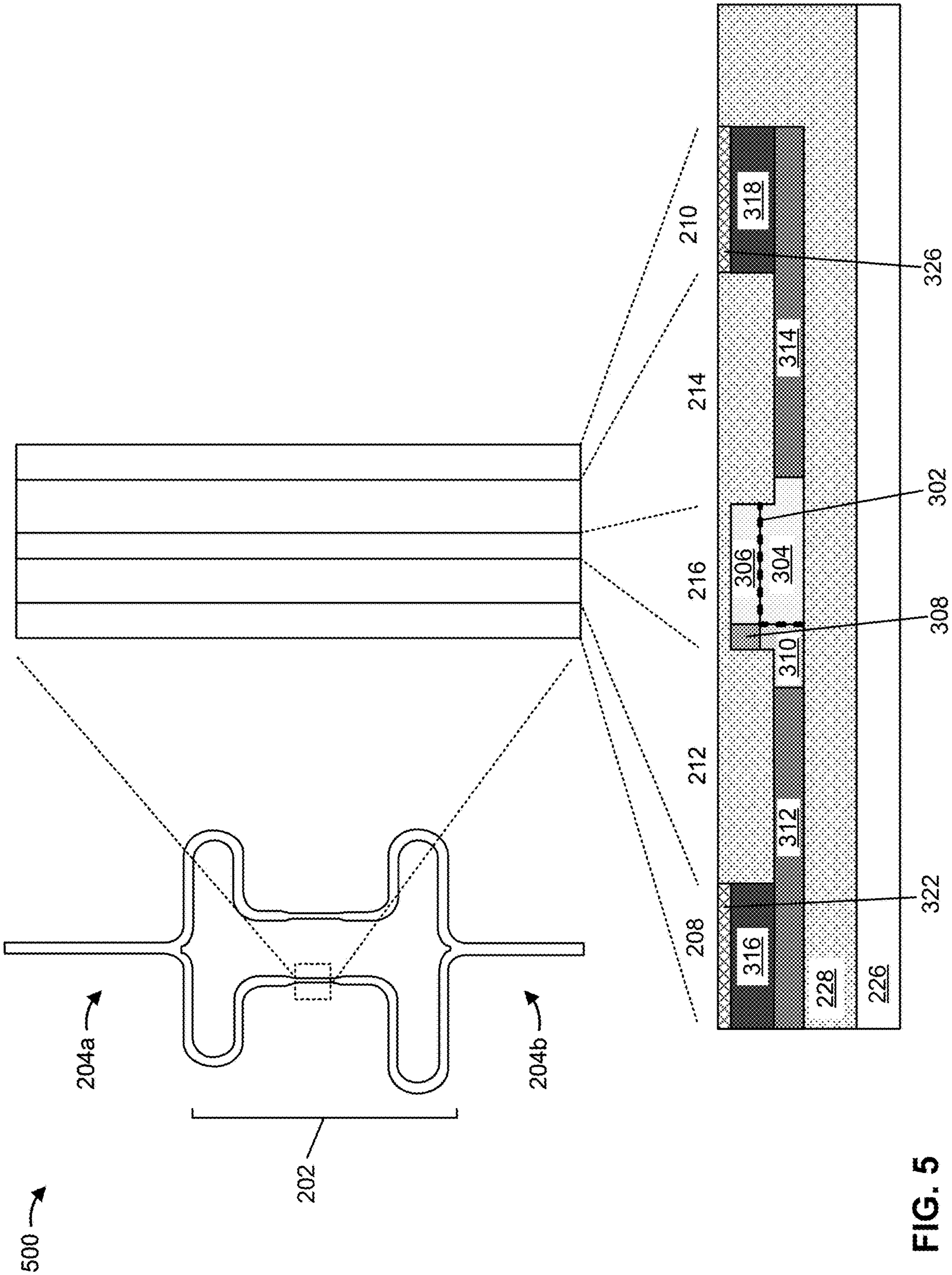
FIG. 5 is a diagram of an example semiconductor device described herein.

FIG. 5 is a diagram of an example semiconductor device 500 described herein. In particular, FIG. 5 illustrates a top-down view of the semiconductor device 500. The semiconductor device 500 may include a semiconductor photonics device and/or another type of semiconductor device that includes one or more photonic integrated circuits. In particular, the semiconductor device 500 may include an optical modulator structure 202 that is coupled with an input waveguide 204*a* and an output waveguide 204*b*. The optical modulator structure 202 may include a Mach-Zehnder modulator (MZM) structure. Moreover, the optical modulator structure 202 may be configured according to the example implementation 300 to include an L-shaped interface 302 in the P-N junction diode 216 of the optical modulator structure 202. The optical modulator structure 202 included in the semiconductor device 500 may be formed using techniques described in connection with FIGS. 4A-4N and/or 6.

The MZM structure of the optical modulator structure 202 enables the optical modulator structure 202 to generate a modulated light output from input light that is provided to the optical modulator structure 202 through the input waveguide 204*a*. The input light may be split and provided to different arms of the optical modulator structure 202 and modulated in the optical mode of the P-N junction diode 216. This enables the input light to be phase modulated by multiple phase shifters in the optical modulator structure 202 and then recombined in the output waveguide 204*b* to form the modulated light output.

As indicated above, FIG. 5 is provided as an example. Other examples may differ from what is described with regard to FIG. 5.

Figure 6:
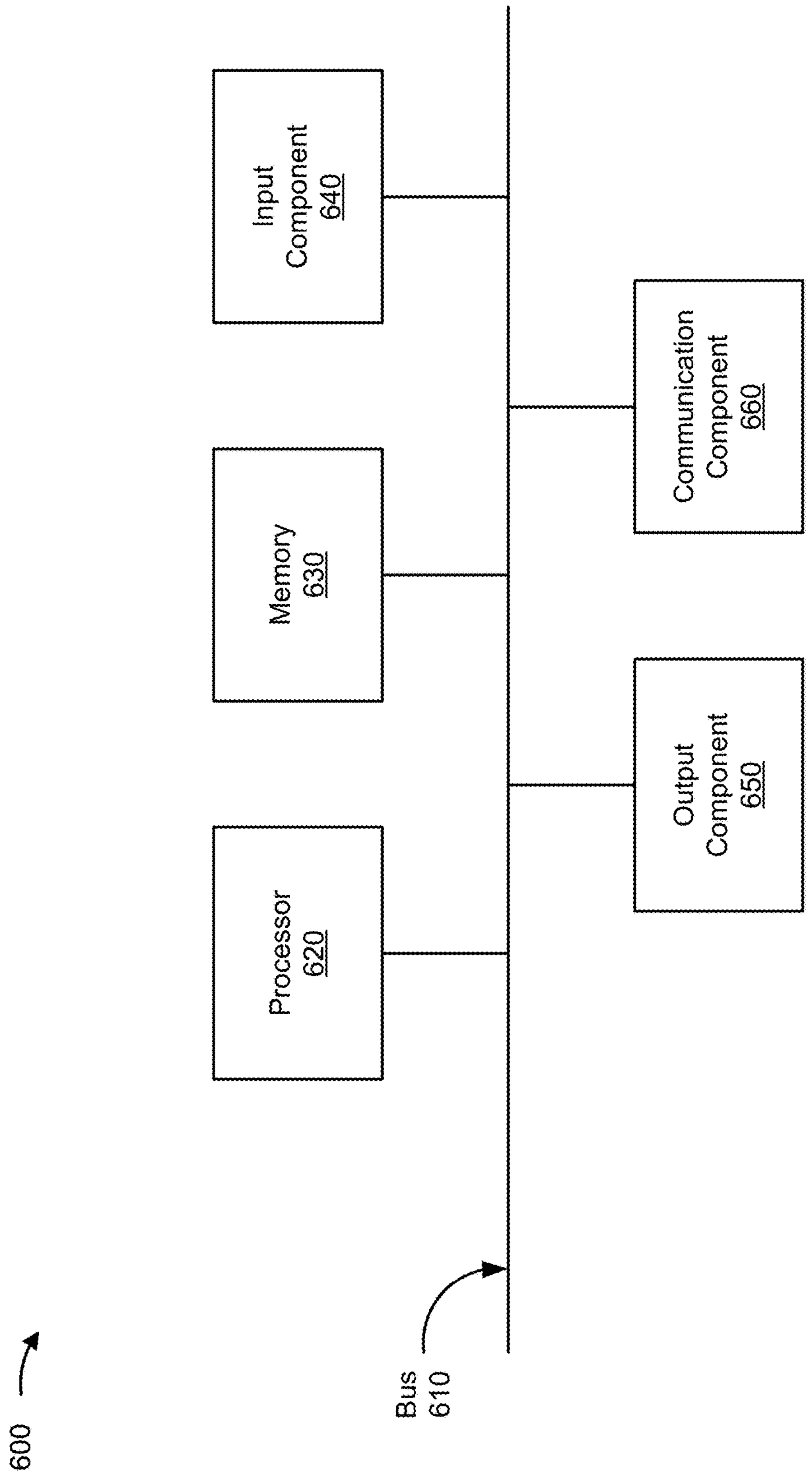
FIG. 6 is a diagram of example components of a device described herein.

FIG. 6 is a diagram of example components of a device 600 described herein. In some implementations, one or more of the semiconductor processing tools 102-114 and/or the wafer/die transport tool 116 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
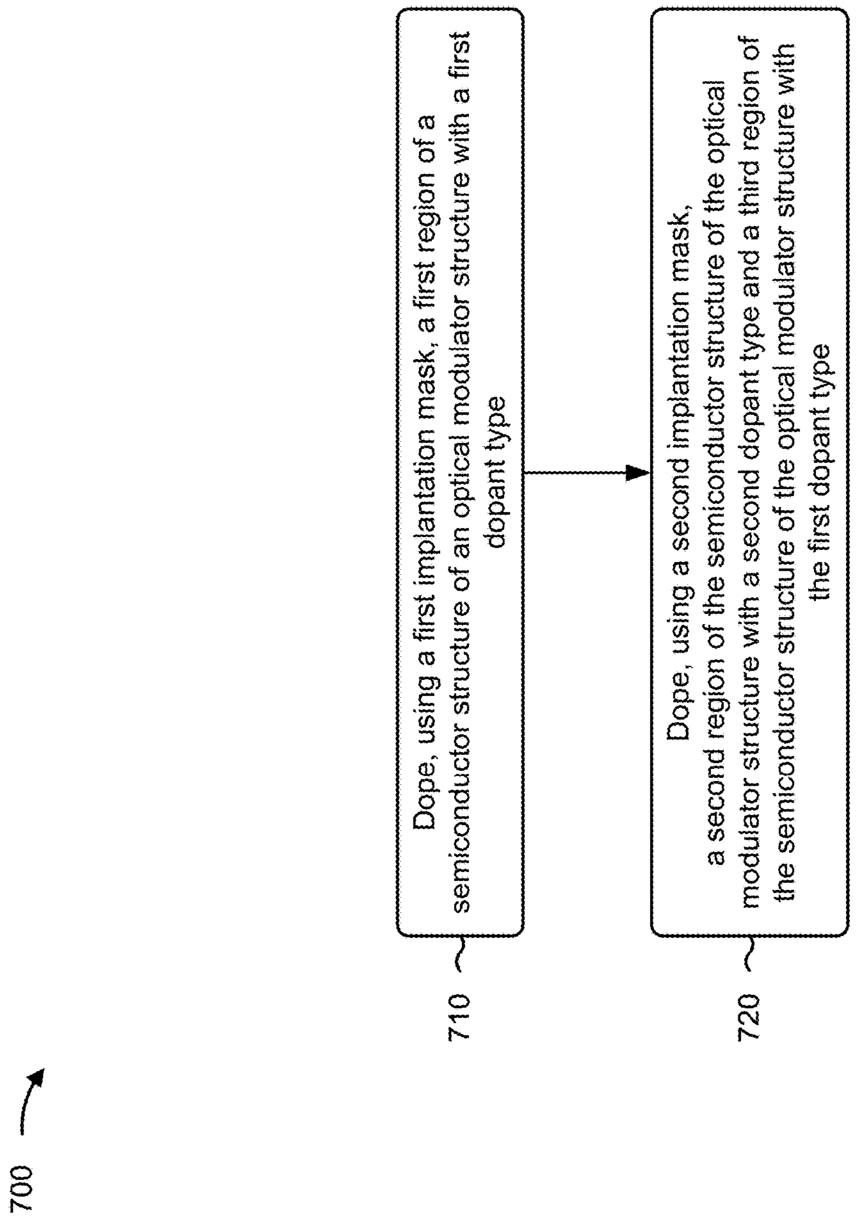
FIG. 7 is a flowchart of an example process associated with forming a semiconductor device.

FIG. 7 is a flowchart of an example process 700 associated with forming a semiconductor photonics device. In some implementations, one or more process blocks of FIG. 7 are performed by one or more semiconductor processing tools (e.g., one or more of the semiconductor processing tools 102-116). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include doping, using a first implantation mask, a first region of a semiconductor structure of an optical modulator structure with a first dopant type (block 710). For example, one or more of the semiconductor processing tools 102-116 may dope, using a first implantation mask (e.g., a photoresist layer 410), a first region 310 of a semiconductor structure 408 of an optical modulator structure 202 with a first dopant type, as described herein.

As further shown in FIG. 7, process 700 may include doping, using a second implantation mask, a second region of the semiconductor structure of the optical modulator structure with a second dopant type and a third region of the semiconductor structure of the optical modulator structure with the first dopant type (block 720). For example, one or more of the semiconductor processing tools 102-116 may dope, using a second implantation mask (e.g., a photoresist layer 416), a second region 304 of the semiconductor structure 408 of the optical modulator structure 202 with a second dopant type and a third region 306 of the semiconductor structure 408 of the optical modulator structure 202 with the first dopant type, as described herein. In some implementations, the second region 304 is adjacent to the first region 310. In some implementations, the third region 306 is over the second region 304. In some implementations, the first region 310, the second region 304, and the third region 310 correspond to a P-N junction diode 216 of the optical modulator structure 202. In some implementations, the first region 310, the second region 304, and the third region 306 form an L-shaped interface 302 of the P-N junction diode 216.

Process 700 may include additional implementations, such as any single implementation or any combination of implementations described below and/or in connection with one or more other processes described elsewhere herein.

In a first implementation, doping the second region 304 and the third region 306 includes doping, using the second implantation mask, the second region 304 in a first implantation operation, and doping, using the second implantation mask, the third region 306 in a second implantation operation after the first implantation operation.

In a second implementation, alone or in combination with the first implementation, doping the second region 304 and the third region 306 includes doping, using the second implantation mask, a first portion 304*a* of the second region 304 in a first implantation operation, doping, using the second implantation mask, a second portion 304*b* of the second region 304 in a second implantation operation after the first implantation operation, where the second portion 304*b* is above the first portion 304*a*, and doping, using the second implantation mask, the third region 306 in a third implantation operation after the second implantation operation.

In a third implementation, alone or in combination with one or more of the first and second implementations, an implantation energy in the second implantation operation is greater relative to an implantation energy in the first implantation operation.

In a fourth implementation, alone or in combination with one or more of the first through third implementations, doping the first region 310 includes doping the first region 310 while a hard mask layer 406 is over the semiconductor structure 408 of the optical modulator structure 202, and doping the second region 304 and the third region 306 includes doping the second region 304 and the third region 306 after the hard mask layer 406 is removed from the semiconductor structure 408 of the optical modulator structure 202.

In a fifth implementation, alone or in combination with one or more of the first through fourth implementations, doping the first region 310 includes doping the first region 310 prior to formation of an STI region 428 around the semiconductor structure 408 of the optical modulator structure 202, and doping the second region 304 and the third region 306 includes doping the second region 304 and the third region 306 after formation of the STI region 428 around the semiconductor structure 408 of the optical modulator structure 202.

In a sixth implementation, alone or in combination with one or more of the first through fifth implementations, the first dopant type includes a p-type dopant and the second dopant type includes an n-type dopant.

In a seventh implementation, alone or in combination with one or more of the first through sixth implementations, the first dopant type includes n n-type dopant and the second dopant type includes an p-type dopant.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

In this way, an optical modulator structure in a photonic integrated circuit includes an L-shaped P-N junction at an optical mode of the optical modulator structure (e.g., an area of the optical modulator structure in which light is generated). The L-shaped P-N junction includes a first portion that includes a first dopant type (e.g., a p-type dopant or an n-type dopant) that overlaps a second portion that includes a second dopant type different from the first dopant type. A first segment of the first portion extends along a side of the second portion. A second segment of the first portion extends along a top of the second portion. The L-shaped P-N junction provides increased area of overlap of the P-N junction at the optical mode relative to another type of junction, such as a horizontal junction or I-shaped junction. The increased area of overlap may enable the optical modulator structure to achieve a greater modulation efficiency.

As described in greater detail above, some implementations described herein provide a semiconductor device. The semiconductor device includes a dielectric layer. The semiconductor device includes an optical modulator structure in the dielectric layer. The optical modulator structure includes a first region including a first dopant type. The optical modulator structure includes a second region, on a top surface of the first region, including a second dopant type. The first region and the second region correspond to a P-N junction diode of the optical modulator structure.

As described in greater detail above, some implementations described herein provide a method. The method includes doping, using a first implantation mask, a first region of a semiconductor structure of an optical modulator structure with a first dopant type. The method includes doping, using a second implantation mask, a second region of the semiconductor structure of the optical modulator structure with a second dopant type, and a third region of the semiconductor structure of the optical modulator structure with the first dopant type. The second region is adjacent to the first region. The third region is over the second region. The first region, the second region, and the third region correspond to a P-N junction diode of the optical modulator structure. The first region, the second region, and the third region form an L-shaped interface of the P-N junction diode.

As described in greater detail above, some implementations described herein provide a semiconductor device. The semiconductor device includes a dielectric layer. The semiconductor device includes an optical modulator structure in the dielectric layer. The optical modulator structure includes a first portion of a P-N junction diode of the optical modulator structure, where the first portion includes a first dopant type. The optical modulator structure includes a second portion of the P-N junction diode, where the second portion includes a second dopant type. The second portion includes a first segment on a top surface of the first portion, a second segment on a side surface of the first portion, and a third segment connecting the first segment and the second segment.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
a dielectric layer; and
an optical modulator structure, in the dielectric layer, comprising:
a first region including a first dopant type;
a second region, on a top surface of the first region, including a second dopant type;
a third region, adjacent to a side of the first region, including the second dopant type; and
a fourth region, connecting the second region and the third region, including the second dopant type,
wherein the first region, the second region, the third region, and the fourth region correspond to a P-N junction diode of the optical modulator structure, and
wherein a dopant concentration of the second dopant type in the fourth region is greater than a dopant concentration of the second dopant type in the second region and greater than a dopant concentration of the second dopant type in the third region.

2. The semiconductor device of claim 1, wherein the first dopant type comprises a p-type dopant; and
wherein the second dopant type comprises an n-type dopant.

3. The semiconductor device of claim 1, wherein the first dopant type comprises n n-type dopant; and
wherein the second dopant type comprises an p-type dopant.

4. The semiconductor device of claim 1, wherein the optical modulator structure comprises a micro-ring modulator (MRM) structure.

5. The semiconductor device of claim 1, wherein the optical modulator structure comprises a Mach-Zehnder modulator (MZM) structure.

6. The semiconductor device of claim 1, wherein a dopant concentration of the first dopant type in the first region is less than the dopant concentration of the second dopant type in the second region, less than the dopant concentration of the second dopant type in the third region, and less than the dopant concentration of the second dopant type in the fourth region.

7. The semiconductor device of claim 1, wherein a size of the second region is larger than a size of the fourth region, and
wherein a size of the third region is larger than the size of the fourth region.

8. A semiconductor device, comprising:
a dielectric layer; and
an optical modulator structure, in the dielectric layer, comprising:
a first portion of a P-N junction diode of the optical modulator structure,
wherein the first portion includes a first dopant type; and
a second portion of the P-N junction diode,
wherein the second portion includes a second dopant type,
wherein the second portion comprises:
a first segment on a top surface of the first portion;
a second segment on a side surface of the first portion; and
a third segment connecting the first segment and the second segment,
wherein a dopant concentration of the second dopant type in the third segment is greater than a dopant concentration of the second dopant type in the first segment and greater than a dopant concentration of the second dopant type in the second segment.

9. The semiconductor device of claim 8, further comprising:
an L-shaped interface between the first portion and the second portion.

10. The semiconductor device of claim 8, wherein a thickness of the first portion is greater relative to a thickness of the first segment of the second portion.

11. The semiconductor device of claim 8, wherein a carrier concentration in the first segment of the second portion is greater relative to a carrier concentration in the first portion.

12. The semiconductor device of claim 8, wherein a dopant concentration of the first dopant type in the first portion is less than the dopant concentration of the second dopant type in the first segment, less than the dopant concentration of the second dopant type in the second segment, and less than the dopant concentration of the second dopant type in the third segment.

13. The semiconductor device of claim 8, wherein a size of the first segment is larger than a size of the third segment, and
wherein a size of the second segment is larger than the size of the third segment.

14. A semiconductor device, comprising:
a dielectric layer; and
an optical modulator structure, in the dielectric layer, comprising:
a first portion of a P-N junction diode of the optical modulator structure,
wherein the first portion includes a first dopant type;
a second portion of the P-N junction diode,
wherein the second portion includes a second dopant type; and
an L-shaped interface between the first portion and the second portion,
wherein the second portion comprises:
a first segment on a top surface of the first portion;
a second segment on a side surface of the first portion; and
a third segment on a top surface of the second segment, and on a side surface of the first segment, and
wherein a dopant concentration of the second dopant type in the third segment is greater than a dopant concentration of the second dopant type in the first segment and greater than a dopant concentration of the second dopant type in the second segment.

15. The semiconductor device of claim 14, wherein a thickness of the first portion is greater relative to a thickness of the first segment of the second portion.

16. The semiconductor device of claim 14, wherein a carrier concentration in the first segment of the second portion is greater relative to a carrier concentration in the first portion.

17. The semiconductor device of claim 14, wherein part of the first portion extends beyond an additional side surface of first segment.

18. The semiconductor device of claim 14, wherein part of the second segment extends beyond a side surface of the third segment.

19. The semiconductor device of claim 14, wherein the L-shaped interface comprises an approximately vertical segment in which the first portion and the second portion are coupled, and an approximately horizontal segment in which the first portion and the second portion are coupled.

20. The semiconductor device of claim 14, wherein a dopant concentration of the first dopant type in the first portion is less than the dopant concentration of the second dopant type in the first segment, less than the dopant concentration of the second dopant type in the second segment, and less than the dopant concentration of the second dopant type in the third segment.

* * * * *